United States Patent
Aoyama

(10) Patent No.: US 8,463,140 B2
(45) Date of Patent: Jun. 11, 2013

(54) RECEPTION DEVICE AND RECEPTION METHOD

(75) Inventor: Chiaki Aoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 12/707,842

(22) Filed: Feb. 18, 2010

(65) Prior Publication Data

US 2010/0215380 A1 Aug. 26, 2010

(30) Foreign Application Priority Data

Feb. 24, 2009 (JP) .................................. 2009-040543

(51) Int. Cl.
*H04B 10/06* (2006.01)

(52) U.S. Cl.
USPC ........... 398/202; 398/203; 398/204; 398/205; 398/206; 398/207; 398/208; 398/209; 398/210; 398/211

(58) Field of Classification Search
None
See application file for complete search history.

(56) References Cited

U.S. PATENT DOCUMENTS

| | | | | |
|---|---|---|---|---|
| 5,532,860 A | * | 7/1996 | Hershey et al. | 398/129 |
| 2002/0024069 A1 | * | 2/2002 | Tsunai | 257/239 |
| 2007/0140706 A1 | * | 6/2007 | Essiambre et al. | 398/202 |
| 2009/0263132 A1 | * | 10/2009 | Rafel et al. | 398/66 |

FOREIGN PATENT DOCUMENTS

| | | |
|---|---|---|
| JP | 2008506927 A | 3/2008 |
| JP | 2008-160372 | 7/2008 |
| JP | 2009111725 A | 5/2009 |
| JP | 2009284128 A | 12/2009 |
| JP | 2010034666 A | 2/2010 |
| WO | 2006000761 A1 | 1/2006 |
| WO | 2007/081939 A2 * | 7/2007 |
| WO | 2009147863 A1 | 10/2009 |

OTHER PUBLICATIONS

Notice of Allowance dated Feb. 26, 2013 in corresponding Japanese Application No. JP2009040543.

* cited by examiner

*Primary Examiner* — Kenneth N Vanderpuye
*Assistant Examiner* — Darren E Wolf
(74) *Attorney, Agent, or Firm* — Squire Sanders (US) LLP

(57) ABSTRACT

A reception device includes at least a light receiving unit, a phase calculation unit, and a demodulation unit. The light receiving unit receives intensity-modulated light from a transmission device. The transmission device executes phase modulation to a bit stream as an object to be transmitted and emits the intensity-modulated light which has an intensity changing at a preset time cycle and a phase changing in response to the phase modulation, and the phase is maintained during M cycles. The phase calculation unit detects the intensity of the intensity-modulated light p times per cycle of the intensity-modulated light and repeatedly calculates the phase of the intensity-modulated light on the basis of a result of the detection. The demodulation unit executes demodulation, which corresponds to the phase modulation, to the phase calculated by the phase calculation unit, and generates transmitted bit stream.

6 Claims, 25 Drawing Sheets

| FRAME | PHASE | PHASE DIFFERENCE | DATA VALUE |
|---|---|---|---|
| LEADER | 0 | | |
| 1 | 1 | 1 | 00 |
| 2 | 4 | 3 | 01 |
| 3 | 3 | -1 | 10 |
| 4 | 0 | -3 | 11 |
| TERMINAL | | | |

FIG. 17

| ESTIMATED ANGLE | CORRECTED ANGLE |
|---|---|
| −180.000 | −180.000 |
| −179.000 | −179.356 |
| −178.000 | −178.698 |
| −177.000 | −178.025 |
| −176.000 | −177.337 |
| −175.000 | −176.634 |
| −174.000 | −175.914 |
| −173.000 | −175.179 |
| −172.000 | −174.428 |
| −171.000 | −173.660 |
| −170.000 | −172.875 |
| −169.000 | −172.073 |
| −168.000 | −171.254 |
| −167.000 | −170.417 |
| −166.000 | −169.563 |
| −165.000 | −168.690 |
| −164.000 | −167.800 |
| −163.000 | −166.891 |
| −162.000 | −165.964 |
| −161.000 | −165.018 |
| −160.000 | −164.055 |
| −159.000 | −163.072 |
| −158.000 | −162.072 |
| −157.000 | −161.053 |
| −156.000 | −160.017 |
| −155.000 | −158.962 |
| −154.000 | −158.891 |
| −153.000 | −156.801 |
| ⋮ | ⋮ |

FIG. 20

| FRAME | INDEX | PHASE | REPRESENTATIVE PHASE | PHASE DIFFERENCE | DATA VALUE |
|---|---|---|---|---|---|
| LEADER | 1 | 0 | 0 | | |
| 1 | 2 | 0 | | | |
| | 3 | 1 | | | |
| | 4 | 1 | 1 | 1 | 00 |
| 2 | 5 | 2 | | | |
| | 6 | 4 | | | |
| | 7 | 4 | 4 | 3 | 01 |
| 3 | 8 | 3 | | | |
| | 9 | 3 | | | |
| | 10 | 3 | 3 | −1 | 10 |
| 4 | 11 | 2 | | | |
| | 12 | 0 | | | |
| | 13 | 0 | 0 | −3 | 11 |
| ... | 14 | 0 | | | |
| | ... | ... | ... | ... | ... |

RECEPTION DEVICE AND RECEPTION METHOD

BACKGROUND OF THE INVENTION

1. Field of the Invention

The present invention relates to a reception device and a reception method for receiving and demodulating modulated light in a field of optical communication.

Priority is claimed on Japanese Patent Application No. 2009-040543, filed Feb. 24, 2009, the content of which is incorporated herein by reference.

2. Description of Related Art

In the past, an optical communication system using light has been proposed. In the optical communication system, a transmission device includes a light emitting element such as an LED (Light Emitting Diode) or the like, and transmits information by emitting intensity-modulated light by the light emitting element.

On the other hand, a reception device having a photodiode receives the information by receiving and demodulating the light emitted by the transmission device. Specifically, the reception device executes demodulation corresponding to intensity modulation by reading charges, generated by photoelectric conversion in the photodiode, a plurality of times during one cycle of a carrier constituted by the intensity-modulated light (for example, Japanese Unexamined Patent Application, First Publication No. 2008-160372).

SUMMARY OF THE INVENTION

In one aspect of the present invention, there is provided a reception device that includes at least: a light receiving unit (for example, a light receiving unit 32 in an embodiment) which receives intensity-modulated light from a transmission device, wherein the transmission device executes phase modulation (for example, π/4-DQPSK in the embodiment) to a bit stream as an object to be transmitted and emits the intensity-modulated light in which has an intensity changing at a preset time cycle and a phase changing in response to the phase modulation, and the phase is maintained during M cycles (where M is an integer at least 2); a phase calculation unit (for example, a phase calculation unit 33 in the embodiment) which detects the intensity of the intensity-modulated light p times per cycle of the intensity-modulated light (where p is an integer at least 3) and repeatedly calculates the phase of the intensity-modulated light on the basis of a result of the detection; and a demodulation unit (for example, a demodulator 34 in the embodiment) which executes demodulation, which corresponds to the phase modulation, to the phase calculated by the phase calculation unit, and generates transmitted bit stream, wherein the light receiving unit includes at least: a photoelectric conversion unit (for example, micro-conversion units 3211a to 3211d in the embodiment) which generates charges corresponding to an intensity of the intensity-modulated light as received; p charge accumulation units (for example, charge accumulation regions 3212a to 3212d in the embodiment), which each accumulates charges generated by the photoelectric conversion unit m times (m is an integer at least 1 and at most M) in the same cycle as that of the intensity-modulated light; and a reset unit (for example, reset electrodes 3215a to 3215d in the embodiment) which resets the charges accumulated by the charge accumulation units after reading the accumulated charges, wherein each charge accumulation unit accumulates the charges at mutually different predetermined timings in one cycle of the intensity-modulated light, wherein the phase calculation unit detects the intensity of the intensity-modulated light on the basis of the accumulated charges by reading the charges accumulated m times in each of the p charge accumulation units, and wherein the reset unit of the light receiving unit resets the charges after the charge accumulation units accumulate the charges m times, and the phase calculation unit reads the charges accumulated m times.

In one aspect of the present invention, a value of M may be the product of n by m (n is an integer at least 2) and the demodulation unit may execute the demodulation on the basis of n phases calculated by the phase calculation unit.

In one aspect of the present invention, the light receiving unit may include a plurality of pixels (for example, a pixel 321a and a pixel 321b in the embodiment) which each includes the photoelectric conversion unit, the p charge accumulation units, and the reset unit, one of pixels accumulates the charges when the phase calculation unit reads the charges from another pixel, and the other pixel accumulates the charges when the phase calculation unit reads the charges from the one of pixels.

In one aspect of the present invention, the light receiving unit may further include a drain unit (for example, a drain region 3217 in the embodiment) which discards charges, which have been generated after one charge accumulation unit finishes accumulating charges and before another charge accumulation unit starts to accumulate charges.

In one aspect of the present invention, the value of m may be at least 2.

Moreover, in another aspect of the present invention, there is provided a reception method to be performed by a reception device including a photoelectric conversion unit which receives intensity-modulated light from a transmission device and generates charges corresponding to a light intensity, wherein the transmission device executes phase modulation to a bit stream as an object to be transmitted and emits the intensity-modulated light which has an intensity changing at a preset time cycle and a phase changing in response to the phase modulation, and the phase is maintained during M cycles (where M is an integer at least 2), p charge accumulation units, each accumulating charges generated by the photoelectric conversion unit m times (m is an integer at least 1 and at most M) in the same cycle as that of the intensity-modulated light, and a reset unit which resets the charges accumulated by the charge accumulation units after reading the accumulated charges, the method including: receiving, by each charge accumulation unit, the intensity-modulated light and accumulating the charges at mutually different predetermined timings in one cycle of the intensity-modulated light; detecting, by the reception device, the intensity of the intensity-modulated light on the basis of the accumulated charges by reading the charges accumulated m times in each of the p charge accumulation units; resetting, by the reset unit of the reception device, the charges after the charge accumulation units accumulate the charges m times, and a phase calculation unit reads the charges accumulated m times; repeatedly calculating, by the reception device, the phase of the intensity-modulated light on the basis of a result of the detection; and executing, by the reception device, demodulation, which corresponds to the phase modulation, to the calculated phase, and generating transmitted bit stream.

BRIEF DESCRIPTION OF THE DRAWINGS

The above features and advantages of the present invention will be more apparent from the following detailed description of certain preferred embodiments taken in conjunction with the accompanying drawings, in which:

FIG. 17 is a diagram showing a specific example of a correction table;

FIG. 20 is a diagram showing a specific example of a demodulation table generated by a demodulator of the third embodiment;

DETAILED DESCRIPTION OF THE PREFERRED EMBODIMENTS

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
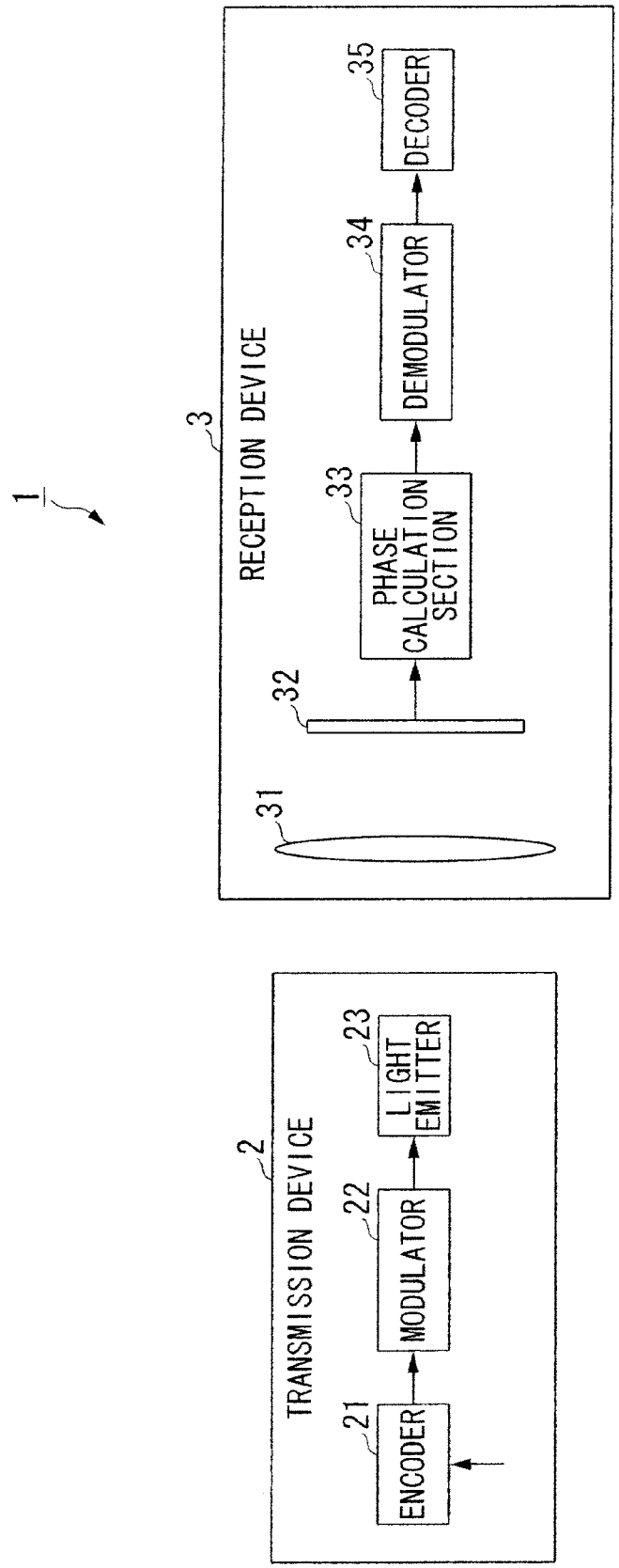
FIG. 1 is a system configuration diagram showing the system configuration of an optical communication system.

FIG. 1 is a system configuration diagram showing the system configuration of an optical communication system 1. The optical communication system 1 includes a transmission device 2 and a reception device 3.

The transmission device 2 includes an encoder 21, a modulator 22, and a light emitter 23.

The encoder 21 generates a bit stream by encoding information to be transmitted.

The modulator 22 generates a carrier by modulating the bit stream generated by the encoder 21 according to a modulation scheme such as DBPSK (Differential Binary Phase Shift Keying), DQPSK (Differential Quadrature Phase Shift Keying), 8DPSK, π/2-DBPSK, or π/4-DQPSK.

The light emitter 23 emits intensity-modulated light on the basis of the carrier generated by the modulator 22. For example, the light emitter 23 is constituted using an LED (Light Emitting Diode) or a laser diode capable of emitting a high-rate (cyclic frequency) visible light pulse. The light emitter 23 may be constituted using a light emitting diode which emits a high-rate infrared pulse.

Figure 2:
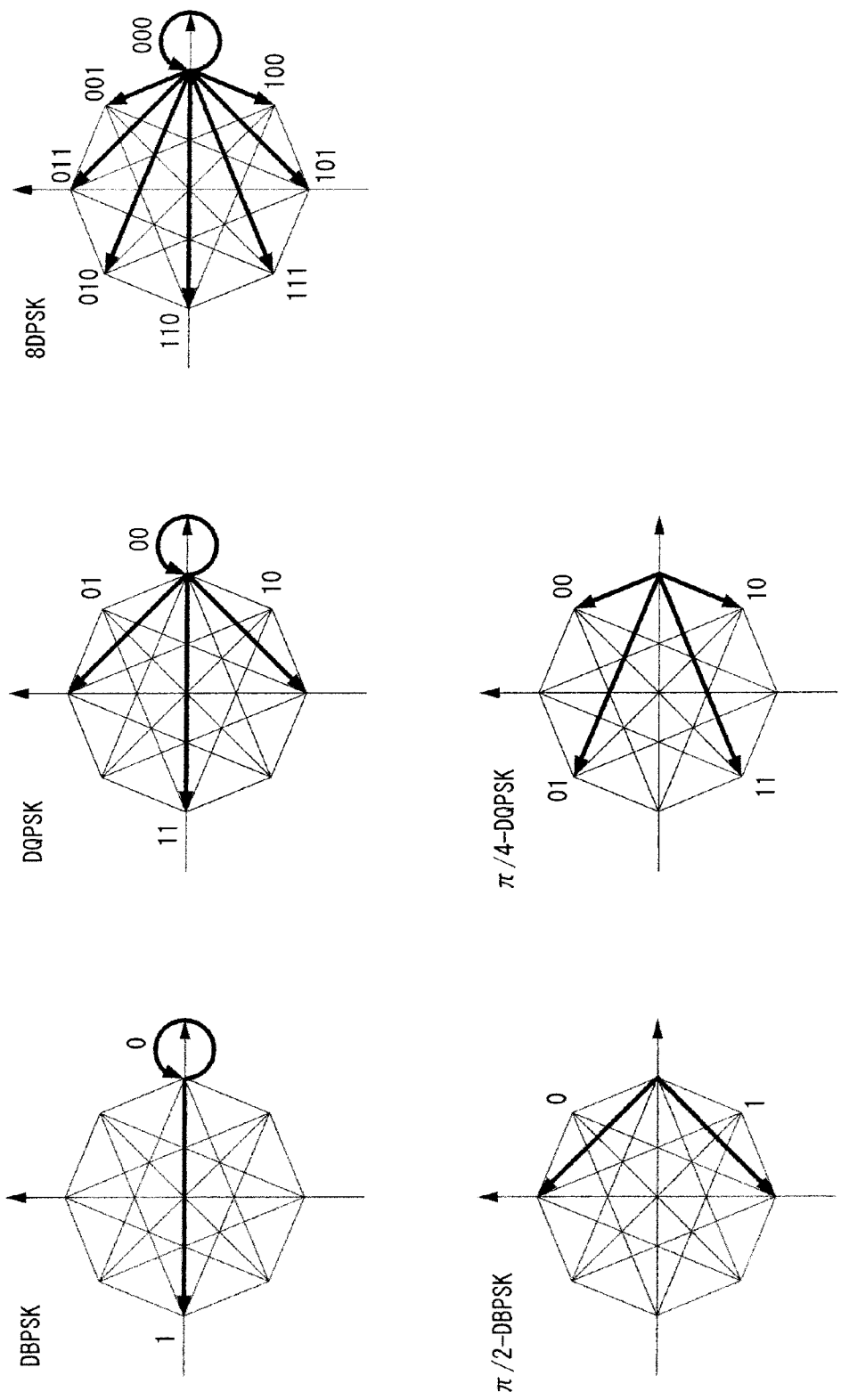
FIG. 2 is a schematic diagram showing each scheme of modulation to be executed by a modulator of a transmission device.

FIG. 2 is a schematic diagram showing each scheme of modulation to be executed by the modulator 22 of the transmission device 2. FIG. 2 shows each modulation scheme illustrated in the above description. In the following description, the modulator 22 performs a modulation operation by π/4-DQPSK. In this case, the phase of a carrier in a certain frame is different from the phase of a carrier in the next frame. A phase difference thereof represents a two-digit bit stream. Specifically, when a phase difference between a carrier of a certain frame and a carrier of the next frame is +π/4, the phase difference represents "00". When the phase difference is +3π/4, the phase difference represents "01". When the phase difference is −π/4, the phase difference represents "10". When the phase difference is −3π/4, the phase difference represents "11".

Figure 3:
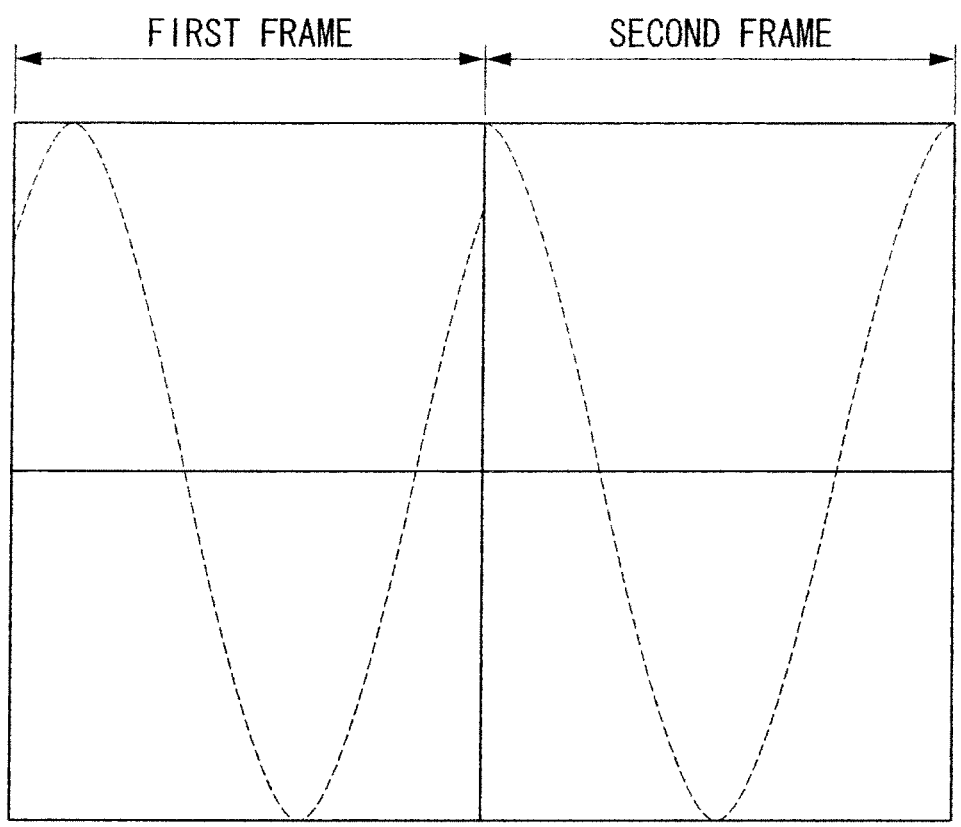
FIG. 3 is a schematic diagram showing the partial configuration of a carrier to be generated by the modulator of the transmission device.

FIG. 3 is a schematic diagram showing the partial configuration of a carrier to be generated by the modulator 22 of the transmission device 2. In the case of FIG. 3, one frame of the carrier is constituted by a sinusoidal wave of one cycle. Since a phase difference between a first frame and a second frame of FIG. 3 is +π/4, a bit stream indicated by the first frame and the second frame becomes "00". Thereafter, a bit stream is expressed on the basis of each of a phase difference between the second frame and a third frame, a phase difference between the third frame and a fourth frame, . . . , a phase difference between an $n^{th}$ frame and an $(n+1)^{th}$ frame. In FIG. 3, one frame of the carrier is constituted by a sinusoidal wave of one cycle, but one frame may be constituted by a continuous sinusoidal wave of a plurality of cycles. In this case, the phase of the sinusoidal wave of each cycle included in the same frame is the same.

Figure 4:
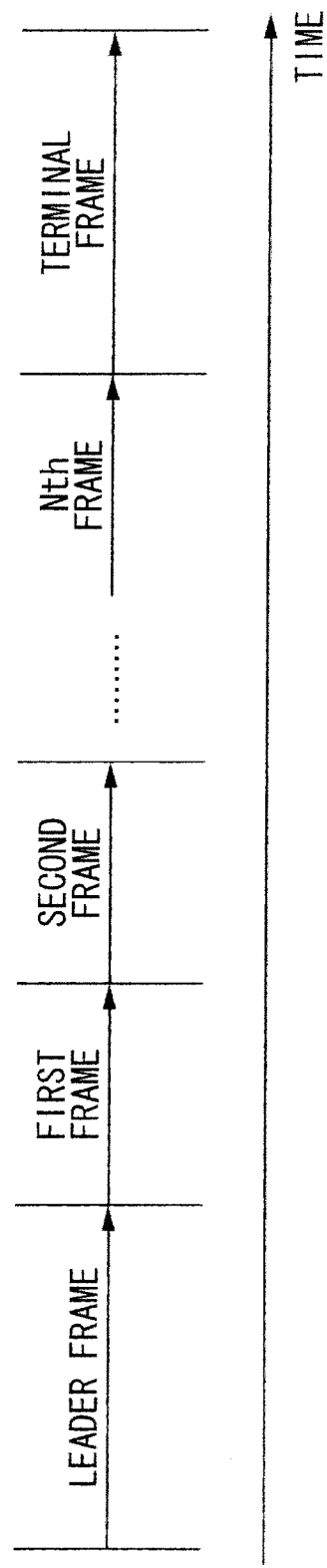
FIG. 4 is a diagram showing the entire configuration of a carrier to be generated by the modulator of the transmission device.

FIG. 4 is a diagram showing the entire configuration of a carrier to be generated by the modulator 22 of the transmission device 2. In FIG. 4, the horizontal axis represents the time, which proceeds from left to right. The carrier has a leader frame to be transmitted on the temporal head at the same phase during a predetermined time (leader frame time). Thereafter, a first frame, a second frame, ..., an $N^{th}$ frame are sequentially transmitted and a terminal frame is finally transmitted on the temporal tail at the same phase during a predetermined time (terminal frame time). As described above, the carrier has the leader frame on the temporal head, the terminal frame on the temporal tail, and has N frames including actual data between the leader frame and the terminal frame. A value of N is defined in response to an amount of information to be actually transmitted. The terminal frame may be unnecessary.

Figure 5:
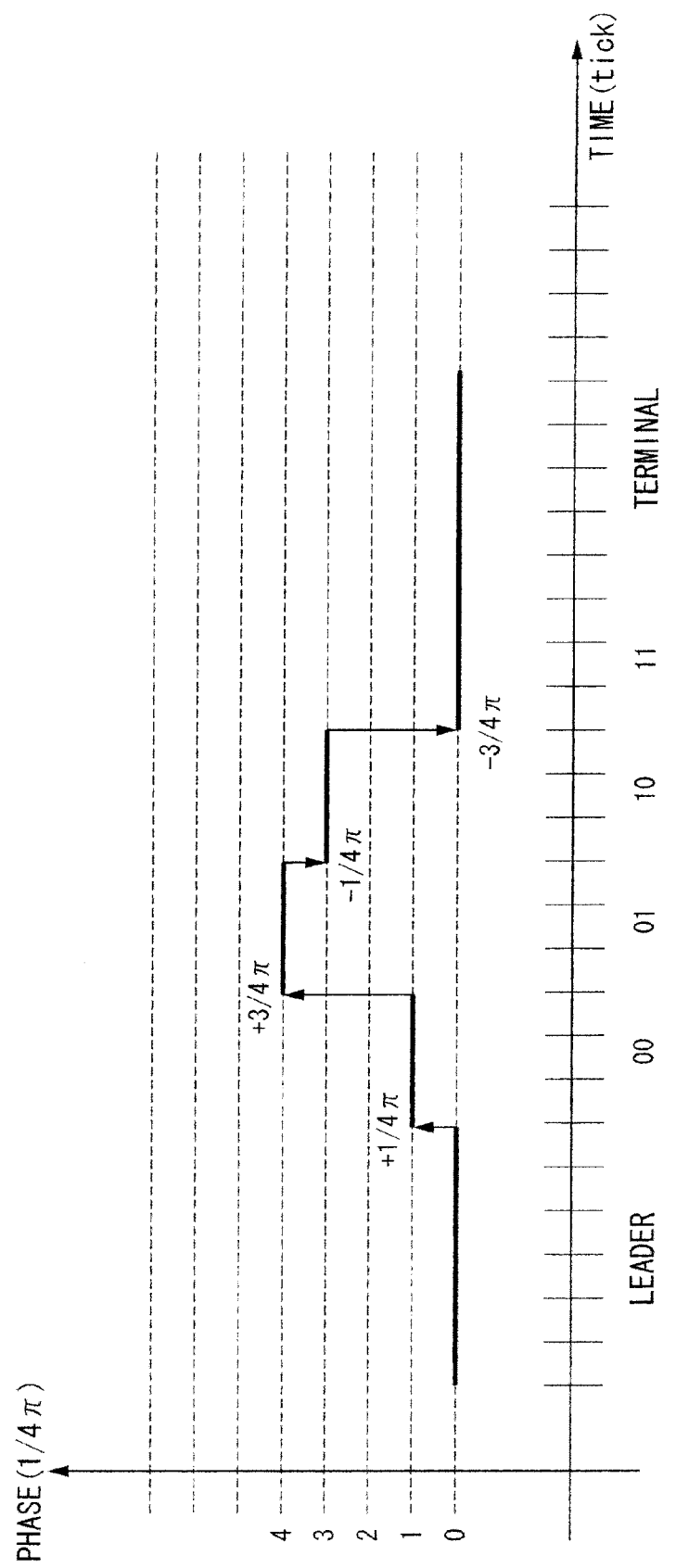
FIG. 5 is a chart showing a specific example of a phase change of the carrier.

FIG. 5 is a chart showing a specific example of a phase change of the carrier. In FIG. 5, the horizontal axis represents the time, the vertical axis represents the phase in each frame of the carrier, and a bit stream "00011011" is transmitted. First, a leader frame is transmitted at a constant phase during a leader frame time.

The phase of the leader frame is calculated as an initial phase by a phase calculation unit 33. When the leader frame time has expired, a first frame is transmitted at a constant phase during a frame time thereof. A phase difference between the leader frame and the first frame indicates a bit stream. In this case, the phase difference is $+\pi/4$, which indicates "00". Next, when the frame time of the first frame has expired, a second frame is transmitted at a constant phase during a frame time thereof. A phase difference between the first frame and the second frame indicates the next bit stream. In this case, the phase difference is $+3\pi/4$, which indicates "01". Next, when the frame time of the second frame has expired, a third frame is transmitted at a constant phase during a frame time thereof. A phase difference between the second frame and the third frame indicates the next bit stream. In this case, the phase difference is $-\pi/4$, which indicates "10". Next, when the frame time of the third frame has expired, a fourth frame is transmitted at a constant phase during a frame time thereof. A phase difference between the third frame and the fourth frame indicates the next bit stream. In this case, the phase difference is $-3\pi/4$, which indicates "11". Since a bit stream to be transmitted is the above when the frame time of the fourth frame has expired, a terminal frame is transmitted at the same phase as that of the frame (in this case, the fourth frame) indicating the last bit stream during a terminal frame time.

Figure 6:
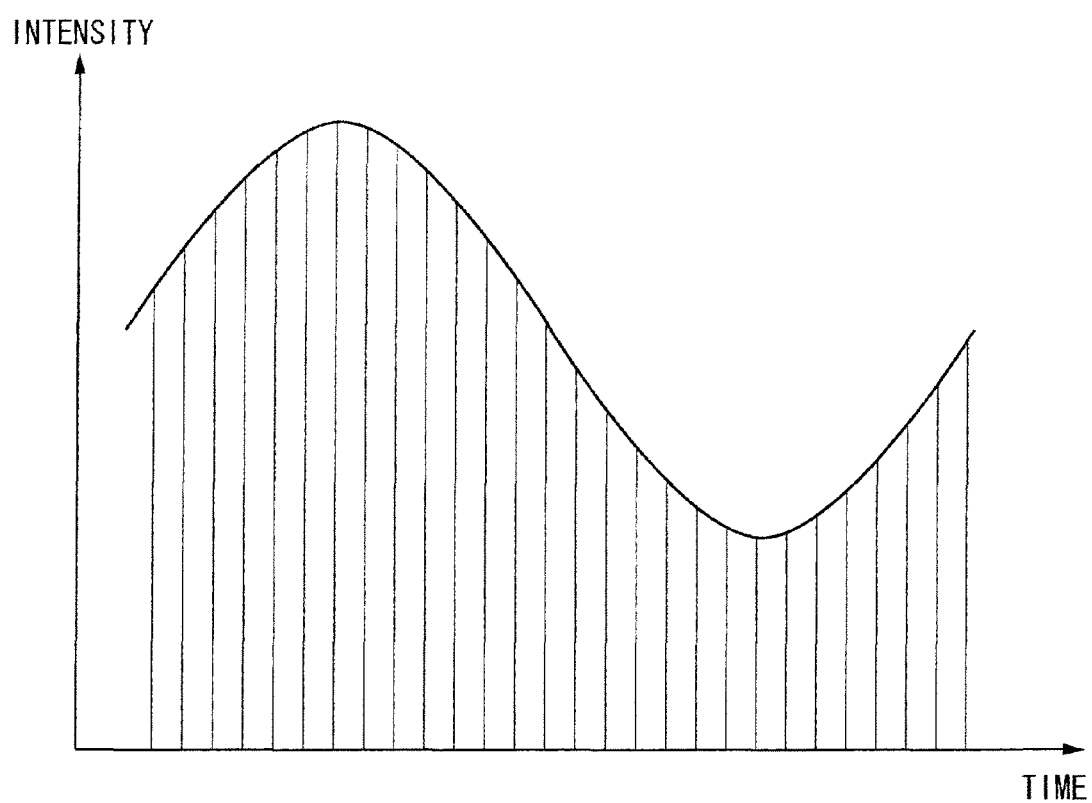
FIG. 6 is a diagram showing a specific example of intensity-modulated light to be emitted by a light emitter.

FIG. 6 is a diagram showing a specific example of intensity-modulated light to be emitted by the light emitter 23. In FIG. 6, the vertical axis represents the intensity of light and the horizontal axis represents the time. As shown in FIG. 6, the intensity of intensity-modulated light varies with time. A waveform represented by a time-varying intensity is a waveform of a carrier generated by the modulator 22. A cycle of the carrier is preset and a value of the cycle is known between the transmission device 2 and the reception device 3.

In the following description, a phase of intensity modulation is a phase of the carrier represented by the time-varying intensity of the intensity-modulated light. A frequency and wavelength of the intensity-modulated light are a frequency and wavelength of the carrier, respectively.

Returning to FIG. 1, the configuration of the optical communication system 1 will be continuously described. The reception device 3 has a lens 31, a light receiving unit 32, the phase calculation unit 33, and a demodulator 34.

The lens 31 passes a light beam including intensity-modulated light emitted from the transmission device 2 and environment light and provides an image to the light receiving unit 32.

The light receiving unit 32 has a structure in which a plurality of pixels is two-dimensionally arranged. The light receiving unit 32 generates and accumulates charges corresponding to light received by the pixels and outputs the accumulated charges to the phase calculation unit 33 at a predetermined timing.

The phase calculation unit 33 reads a voltage level corresponding to the charges accumulated by the light receiving unit 32 at a predetermined timing and calculates an amplitude and phase of a carrier represented by intensity-modulated light.

The demodulator 34 executes a demodulation process on the basis of a phase calculated by the phase calculation unit 33 and generates a bit stream transmitted from the transmission device 2.

A decoder 35 decodes the bit stream generated by the demodulator 34 and outputs transmitted information.

Figure 7:
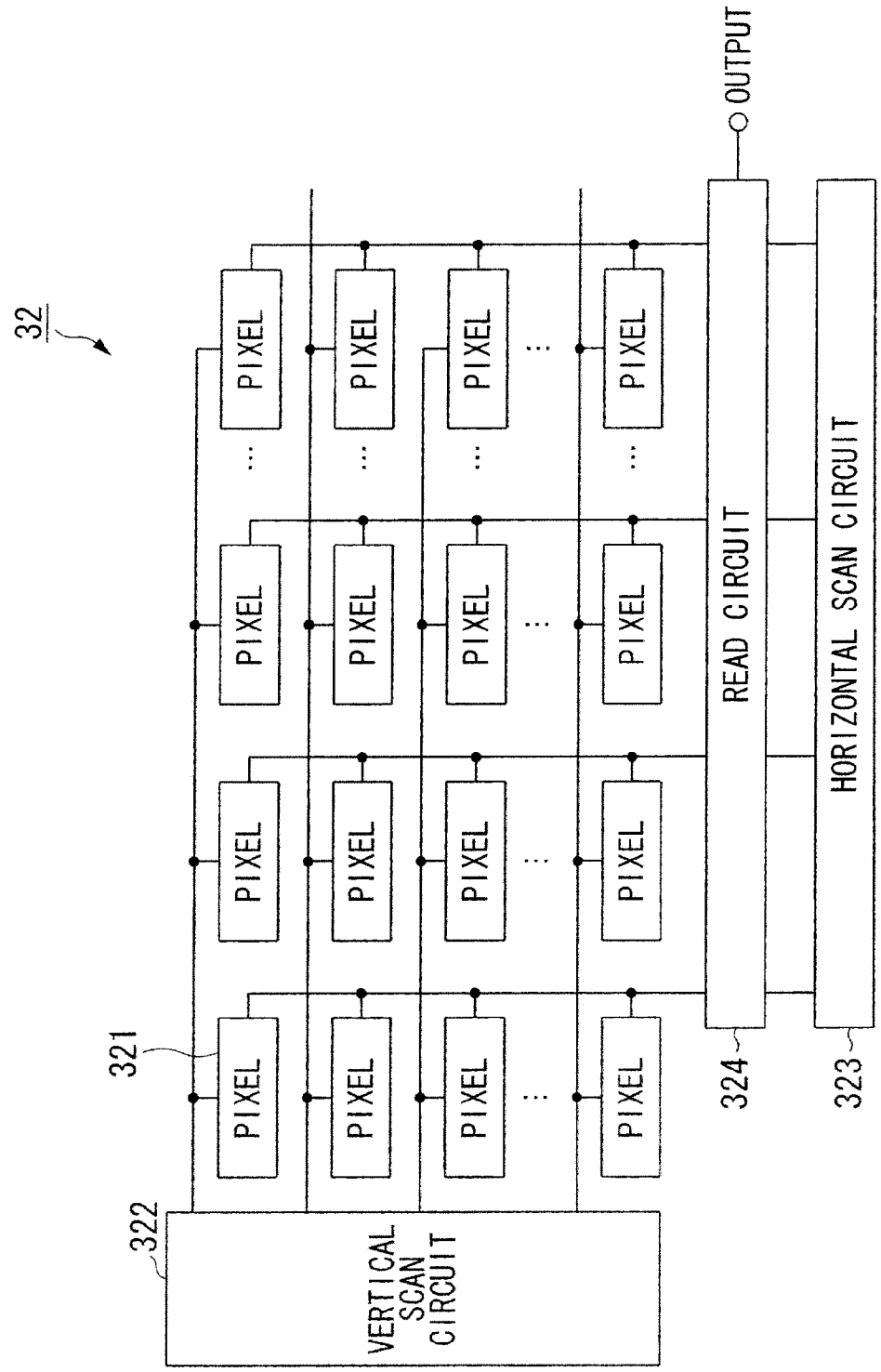
FIG. 7 is a schematic diagram showing the configuration of a light receiving unit.

FIG. 7 is a schematic diagram showing an outline of the configuration of the light receiving unit 32. The light receiving unit 32 has a plurality of pixels 321, a vertical scan circuit 322, a horizontal scan circuit 323, and a read circuit 324. The pixels 321 arranged in a two-dimensional matrix shape generate and accumulate charges by receiving light passing through the lens 31. A voltage level corresponding to charges accumulated in each pixel 321 is read by the read circuit 324 under control of the vertical scan circuit 322 and the horizontal scan circuit 323. The read voltage level is output from the read circuit 324 to the phase calculation unit 33.

Figure 8:
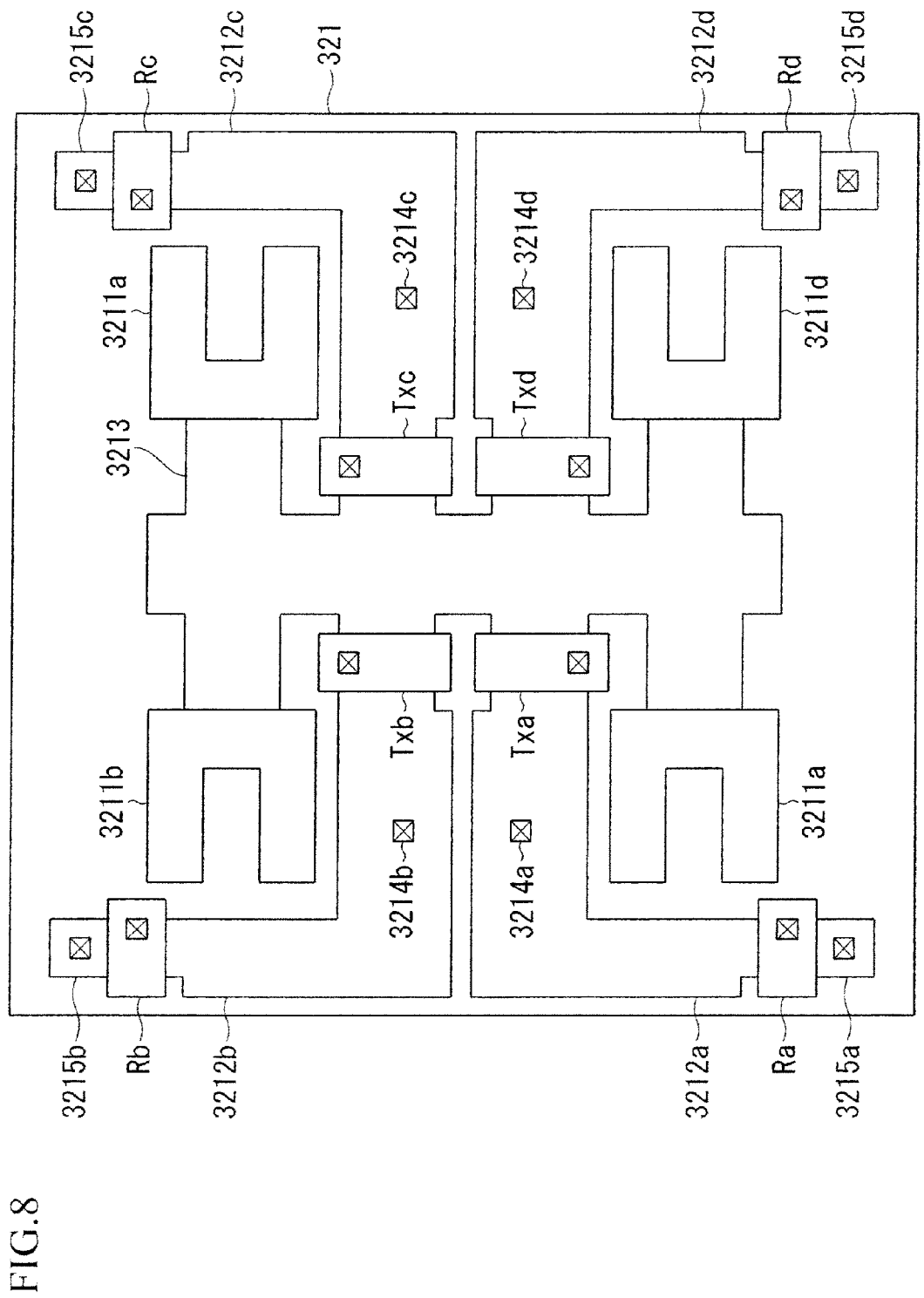
FIG. 8 is a configuration diagram showing the configuration of a pixel to be used in the light receiving unit.

FIG. 8 is a configuration diagram showing the configuration of the pixel 321 used in the light receiving unit 32. The pixel 321 has 4 micro-conversion units 3211a to 3211d. Each of the micro-conversion units 3211a to 3211d is constituted using a photoelectric conversion element. The pixel 321 has 4 charge accumulation regions 3212a to 3212d and distribution gates Txa to Txd corresponding to the charge accumulation regions 3212a to 3212d. The 4 micro-conversion units 3211a to 3211d are connected to the charge accumulation regions 3212a to 3212d via a charge transfer region 3213 and the distribution gates Txa to Txd.

The charges generated by the photoelectric conversion in the micro-conversion units 3211a to 3211d are moved to the charge transfer region 3213 having the lower potential. When one of the distribution gates Txa to Txd is opened, the charges are moved from the charge transfer region 3213 to one of the charge accumulation regions 3212a to 3212d corresponding to the opened distribution gate of the distribution gates Txa to Txd. The charges moved to each of the charge accumulation regions 3212a to 3212d are accumulated by each of the charge accumulation regions 3212a to 3212d until a predetermined timing is reached. At the predetermined timing, the accumulated charges are read and output from electrodes 3214a to 3214d to the phase calculation unit 33 via the read circuit 324.

The pixel 321 has reset gates Ra to Rd and reset electrodes 3215a to 3215d respectively adjacent to the charge accumulation regions 3212a to 3212d. The reset gates Ra to Rd are opened, the charge accumulation regions 3212a to 3212d are charged to be in a reset state by a voltage V applied to the reset electrodes 3215a to 3215d. This reset process is simultaneously executed for all the charge accumulation regions 3212a to 3212d of all the pixels 321 of the light receiving unit 32.

Figure 9:
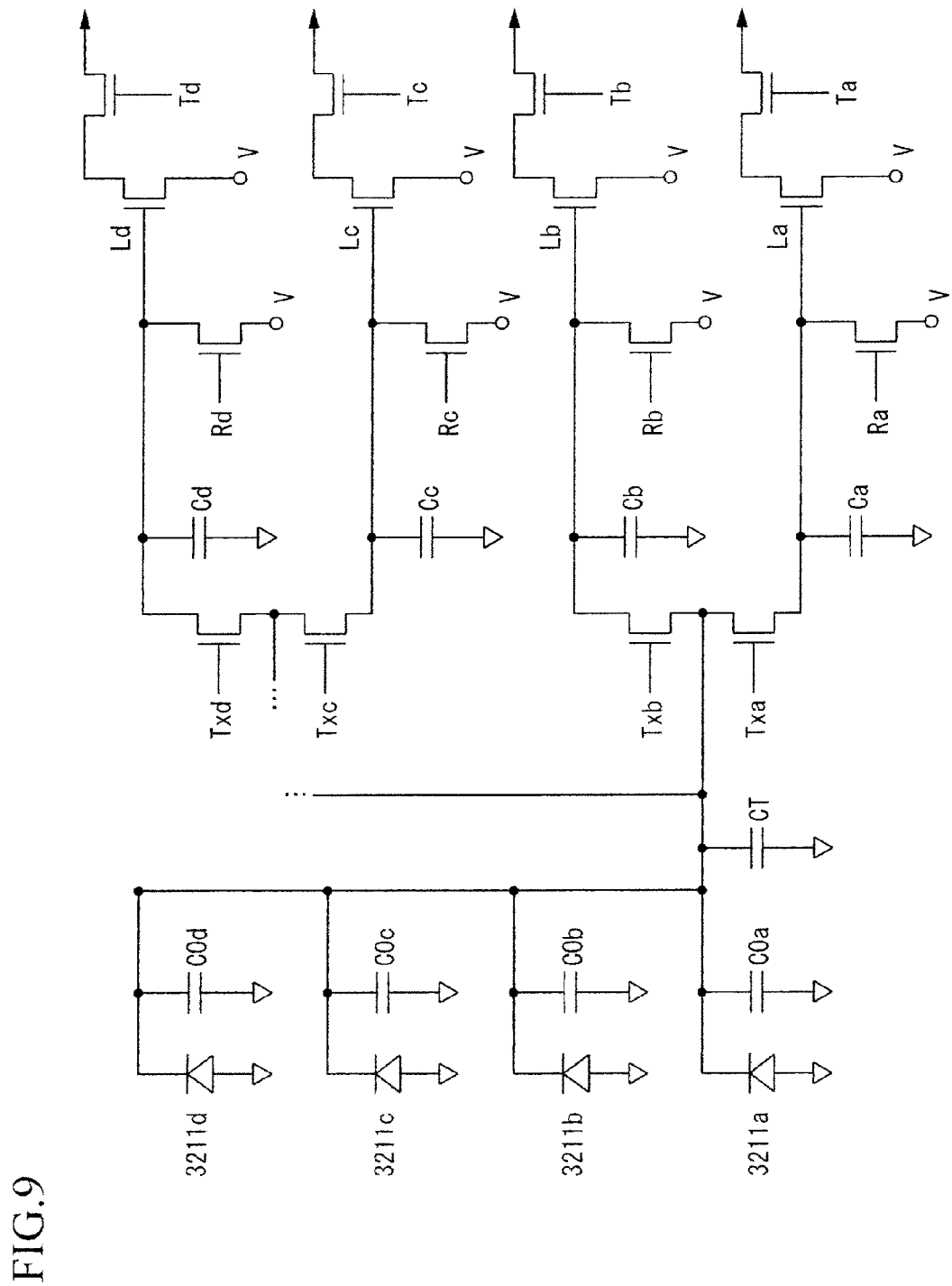
FIG. 9 is a diagram showing an equivalent circuit of the pixel of FIG. 8.

FIG. 9 is a diagram showing an equivalent circuit of the pixel 321 of FIG. 8. In FIG. 9, the micro-conversion units 3211a to 3211d are represented as pairs of photodiodes and capacitors C0a to C0d. The charge transfer region 3213 is represented as a capacitor CT. The charge accumulation regions 3212a to 3212d respectively adjacent to the distribution gates Txa to Txd are represented as capacitors Ca to Cd. These capacitors are charged by a voltage V when FET transistors of the reset gates Ra to Rd are turned on. This operation is the above-described reset process, which is a process for returning the state of the charge accumulation regions 3212a to 3212d to a state (initial state) before the charges are accumulated by the micro-conversion units 3211a to 3211d.

FET transistors La to Ld are level shift transistors. When read gates Ta to Td are opened, the FET transistors La to Ld respectively output currents corresponding to charges held in the capacitors Ca to Cd to the phase calculation unit 33 via the read circuit 324.

The 4 micro-conversion units 3211a to 3211d and the charge transfer region 3213 can be formed by an integrated N-region embedded in a P-well. A light shielding curtain (light shielding mask) is constituted to be installed above the integrated N-region so that light enters only the micro-conversion units 3211a to 3211d among elements of the pixel 321.

Figure 10:
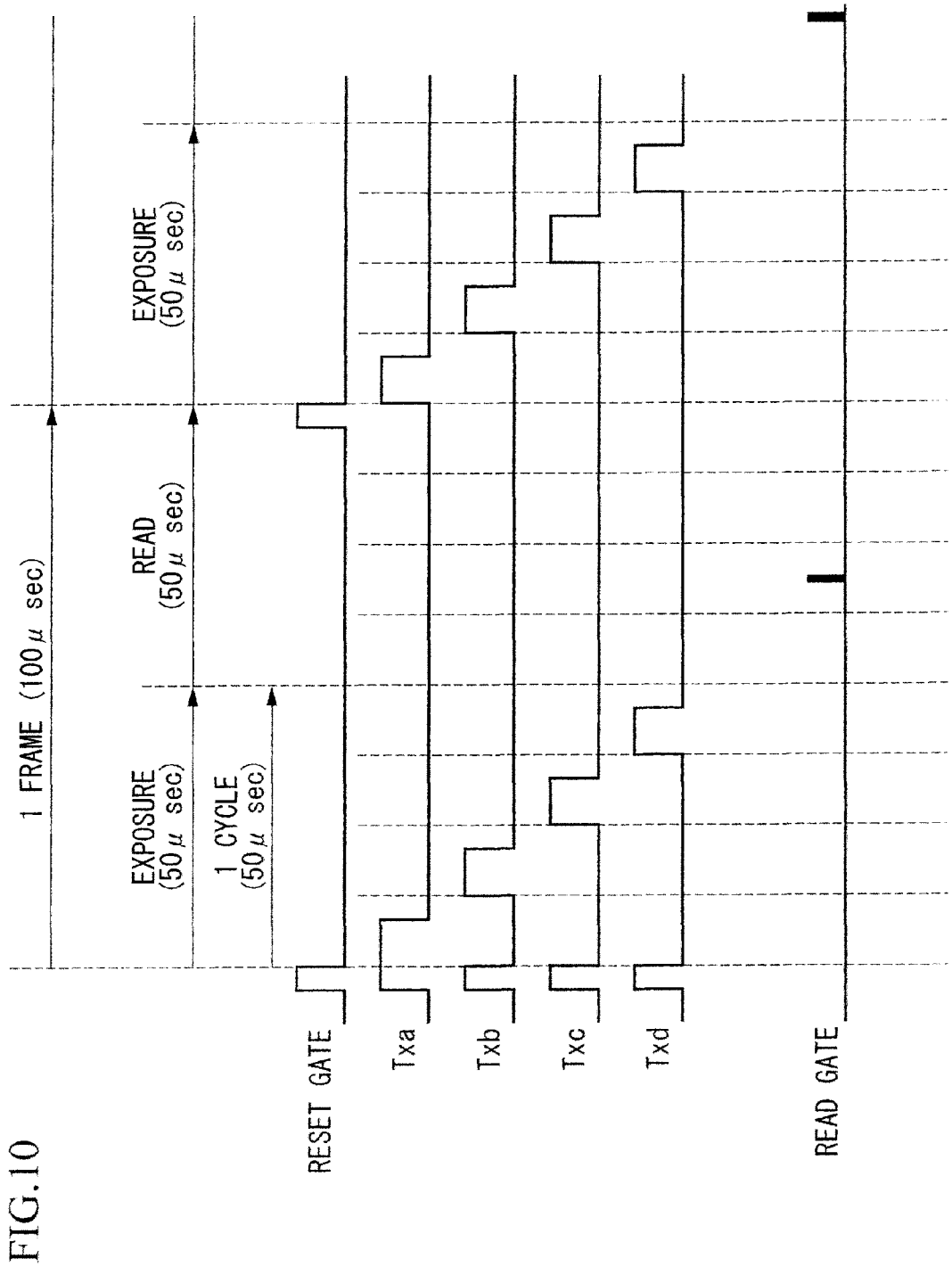
FIG. 10 is a timing chart showing the operation of a pixel according to a first embodiment.

FIG. 10 is a timing chart showing the operation of the pixel 321 according to the first embodiment.

In the following description, one cycle is a constant value representing a time of one cycle of a sinusoidal wave constituting a carrier. In FIG. 10, an exposure process by the pixel 321 is executed over a time of one cycle and thereafter the read circuit 324 executes a read process over a time of one cycle. In the following description, the time in which the exposure process is executed is referred to as the "exposure time" and the time in which the read process is executed is referred to as the "read time". The time of one frame (frame time) is the sum of the exposure time and the read time.

First, immediately before the exposure process is started, the pixel 321 resets (charges) the charge transfer region 3213 and the charge accumulation regions 3212a to 3212d by opening the reset gates Ra to Rd and also opening the 4 distribution gates Txa to Txd. When the exposure time starts, the pixel 321 first opens the distribution gate Txa and accumulates charges generated by the 4 micro-conversion units 3211a to 3211d to the charge accumulation region 3212a (the capacitor Ca) via the charge transfer region 3213. The charges accumulated from the charge transfer region 3213 to the charge accumulation region 3212a operate to decrease the voltage of the capacitor Ca.

Next, the pixel 321 closes the distribution gate Txa before the ¼ cycle has elapsed after the start of the exposure time, opens the distribution gate Txb at the timing of the passage of the ¼ cycle, and accumulates charges generated by the 4 micro-conversion units 3211a to 3211d to the charge accumulation region 3212b (the capacitor Cb) via the charge transfer region 3213. Next, the pixel 321 closes the distribution gate Txb before the 2/4 cycle has elapsed after the start of the exposure time, opens the distribution gate Txc at the timing of the passage of the 2/4 cycle, and accumulates charges generated by the 4 micro-conversion units 3211a to 3211d to the charge accumulation region 3212c (the capacitor Cc) via the charge transfer region 3213. Next, the pixel 321 closes the distribution gate Txc before the ¾ cycle has elapsed after the start of the exposure time, opens the distribution gate Txd at the timing of the passage of the ¾ cycle, and accumulates charges generated by the 4 micro-conversion units 3211a to 3211d to the charge accumulation region 3212d (the capacitor Cd) via the charge transfer region 3213. Before one cycle has elapsed after the start of the exposure time, the pixel 321 closes the distribution gate Txd and executes a reset process in preparation for a process for the next frame. As described above, the time until the next distribution gate is opened after a certain distribution gate is opened is a value produced by dividing the exposure time by the number of distribution gates, and is set as a uniform length time for each gate.

When the process of one cycle is completed, the pixel 321 opens the read gates Ta to Td during the read time. Since voltages of the capacitors Ca to Cd are applied to the gates of the level shift transistors La to Ld, a current corresponding to the voltage level of each capacitor flows through the phase calculation unit 33 in response to an opening operation of the read gates Ta to Td. The phase calculation unit 33 calculates the amplitude and phase of a carrier on the basis of the voltage level read from each of the read gates Ta to Td.

Figures 11, 12:
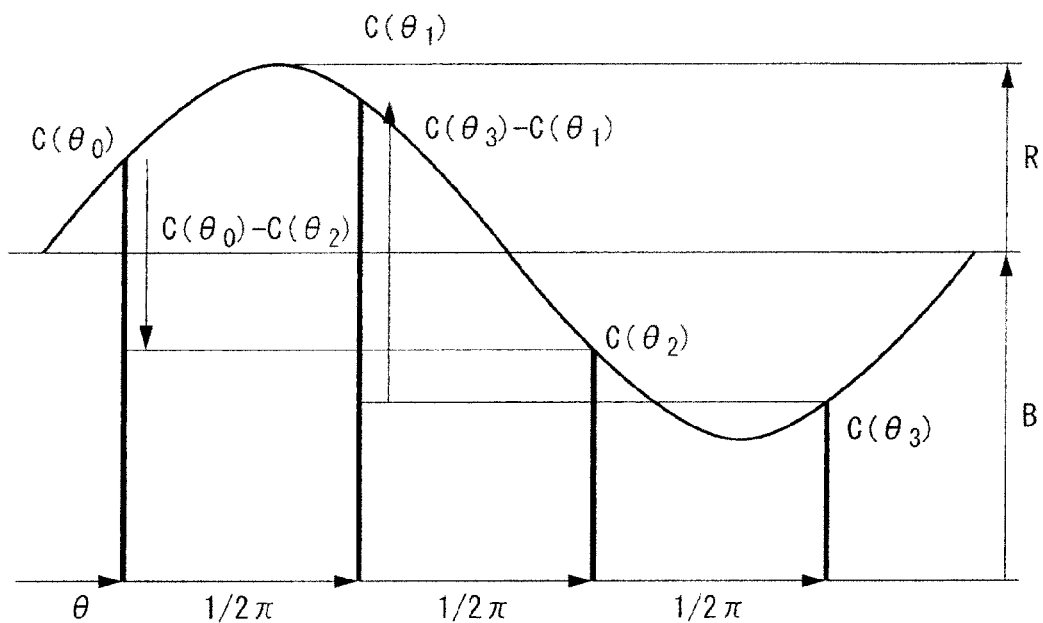
FIG. 11 is a schematic diagram showing an outline for calculating the amplitude and phase of a carrier on the basis of 4 voltage levels read from the pixel.
FIG. 12 is a diagram showing a specific example of a demodulation table generated by a demodulator.

FIG. 11 is a schematic diagram showing an outline for calculating an amplitude and phase of a carrier on the basis of 4 voltage levels read from the pixel 321. The waveform shown in FIG. 11 represents a sinusoidal wave of one cycle constituting the carrier. $C(\theta_0)$, $C(\theta_1)$, $C(\theta_2)$, and $C(\theta_3)$ are voltage levels read from the charge accumulation regions 3212a to 3212d of each pixel 321, that is, intensities of the carrier for every ¼ cycle. The phase calculation unit 33 calculates an amplitude R of the carrier by substituting $C(\theta_0)$, $C(\theta_1)$, $C(\theta_2)$, and $C(\theta_3)$ into Expression (1).

$$B = \frac{C(\theta_0) + C(\theta_1) + C(\theta_2) + C(\theta_3)}{4} \qquad \text{[Expression 1]}$$

$$R = \sqrt{\frac{(C(\theta_0) - B)^2 + (C(\theta_1) - B)^2 + (C(\theta_2) - B)^2 + (C(\theta_3) - B)^2}{2}}$$

The phase calculation unit 33 calculates amplitudes R for all pixels 321, and calculates phases θ only for a pixel 321 (a bright point pixel) having an amplitude R exceeding a predetermined threshold value and its surrounding pixels 321.

Hereinafter, the bright point pixel and its surrounding pixels 321 are together called "processing object pixels". Since general environment light has a substantially invariant intensity, its amplitude R becomes a very small value close to zero. On the other hand, since intensity-modulated light is emitted so that the amplitude R becomes a large value by artificially periodically changing the intensity by the transmission device 2, it is decayed in response to the distance between the transmission device 2 and the reception device 3, but has a value equal to or more than a predetermined threshold value. Thus, the phase calculation unit 33 can calculate a phase θ only for a pixel 321 receiving the intensity-modulated light by detecting a processing object pixel using the threshold value as described above. It is possible to calculate only a phase θ of the intensity-modulated light. At this time, when phase values calculated from a plurality of processing object pixels are different, the phase calculation unit 33 calculates an average value or a representative value of the phase values and handles the calculated value as the phase θ. The above-described threshold value is preset by the phase calculation unit 33 in response to the amplitude of the intensity-modulated light emitted by the transmission device 2 and the assumed distance between the transmission device 2 and the reception device 3. When no processing object pixel is detected, the phase calculation unit 33 may be constituted to output the phase θ calculated in a previous process, may be constituted to determine that an error has occurred due to signal deficiency caused by shield light or the like, or may be constituted to detect it as signal termination in place of a terminal frame.

As described above, the phase calculation unit 33 calculates a carrier phase θ by substituting $C(\theta_0)$, $C(\theta_1)$, $C(\theta_2)$, and $C(\theta_3)$ obtained from a processing object pixel and values of R and B calculated by Expression (1) into Expression (2), and outputs the calculated phase θ to the demodulator 34.

$$\frac{C(\theta_3) - C(\theta_1)}{C(\theta_0) - C(\theta_2)} = \frac{\{R\cos(\theta + \frac{3}{2}\pi) + B\} - \{R\cos(\theta + \frac{1}{2}\pi) + B\}}{\{R\cos\theta + B\} - \{R\cos(\theta + \pi) + B\}}$$ [Expression 2]

$$= \frac{\cos(\theta + \frac{3}{2}\pi) - \cos(\theta + \frac{1}{2}\pi)}{\cos\theta - \cos(\theta + \pi)}$$

$$= \frac{\sin\theta + \sin\theta}{\cos\theta + \cos\theta}$$

$$= \frac{\sin\theta}{\cos\theta}$$

$$= \tan\theta$$

$$\theta = \begin{cases} \tan^{-1}\frac{C(\theta_3) - C(\theta_1)}{C(\theta_0) - C(\theta_2)} & \text{When } (0 < C(\theta_0) - C(\theta_2)) \\ -\frac{\pi}{2} + \tan^{-1}\frac{C(\theta_3) - C(\theta_1)}{C(\theta_0) - C(\theta_2)} & \text{When } (C(\theta_0) - C(\theta_2) < 0, \\ & C(\theta_3) - C(\theta_1) < 0) \\ \frac{\pi}{2} + \tan^{-1}\frac{C(\theta_3) - C(\theta_1)}{C(\theta_0) - C(\theta_2)} & \text{When } (C(\theta_0) - C(\theta_2) < 0, \\ & 0 < C(\theta_3) - C(\theta_1)) \\ -\frac{\pi}{2} & \text{When } (C(\theta_0) - C(\theta_2) = 0, \\ & C(\theta_3) - C(\theta_1) < 0 \\ \frac{\pi}{2} & \text{When } (C(\theta_0) - C(\theta_2) = 0, \\ & 0 < C(\theta_3) - C(\theta_1) \end{cases}$$

FIG. 12 is a diagram showing a specific example of a demodulation table generated by the demodulator 34. The demodulator 34 generates the modulation table on the basis of the phase difference in each frame output by the phase calculation unit 33, and generates a bit stream transmitted from the transmission device 2. The decoder 35 recovers transmission information. The demodulation table has a phase of each frame, a phase difference in each frame, and a data value corresponding to the phase difference which is associated for every frame number.

The frame phase indicates a phase value of each frame calculated by the phase calculation unit 33, and its unit is π/4. The phase of the leader frame becomes "0" (the initial phase). The phase difference represents a phase difference between each frame and a previously transmitted frame, and its unit is π/4. The data value is a bit stream corresponding to the phase difference. The case of FIG. 12 is a bit stream obtained on the basis of the π/4-DQPSK scheme. The demodulator 34 generates a transmitted bit stream by creating the demodulation table and finally sequentially arranging the data value corresponding to each frame. The decoder 35 recovers transmission information.

Figure 13:
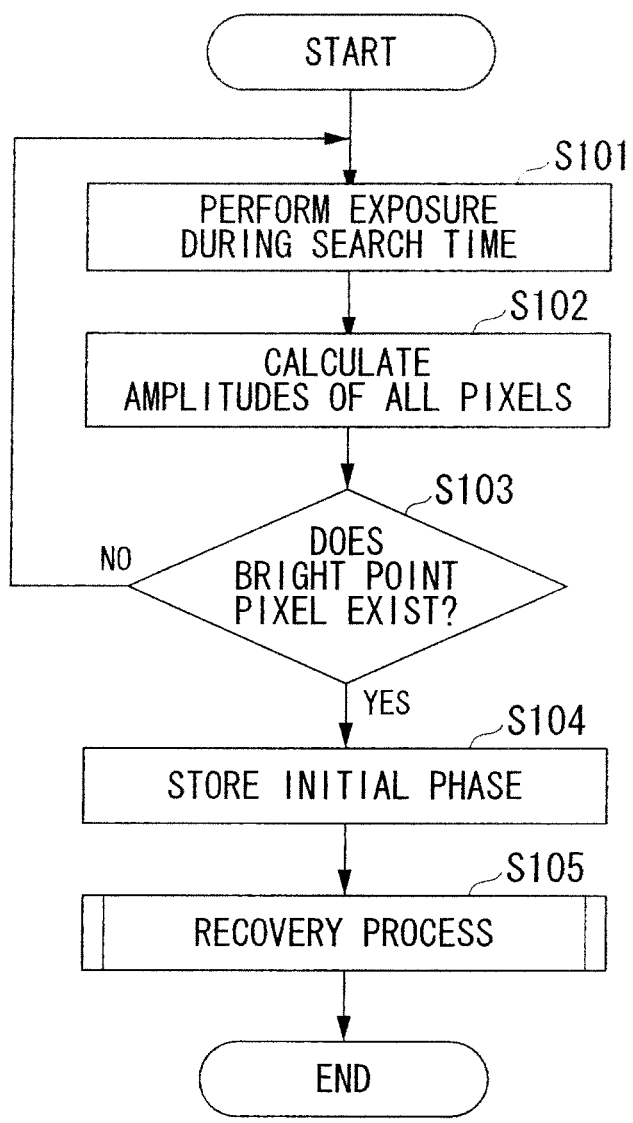
FIG. 13 is a flowchart showing the flow of a process of a reception device.

FIG. 13 is a flowchart showing the flow of a process of the reception device 3. First, the light receiving unit 32 performs an exposure operation during a search time (for example, 2 msec) (step S101). The search time is the exposure time for detecting a leader frame and is a time preset to the reception device 3 in response to a leader frame time. Specifically, the search time is set to be shorter than half the leader frame time on the basis of a sampling theorem.

Next, the phase calculation unit 33 calculates amplitudes R for all pixels 321 of the light receiving unit 32 (step S102). Next, the phase calculation unit 33 detects a bright point pixel by comparing the amplitude R of each pixel 321 with a threshold value (step S103). When no bright point pixel is detected (step S103—NO), the reception device 3 repeatedly executes the process of steps S101 to S103 until the bright point pixel is detected.

When the bright point pixel has been detected (step S103—YES), the phase calculation unit 33 calculates a phase of intensity-modulated light on the basis of a voltage level of a processing object pixel, and stores the calculated phase value as an initial phase (step S104). The light receiving unit 32 recovers transmission information by executing a recovery process (step S105).

Figure 14:
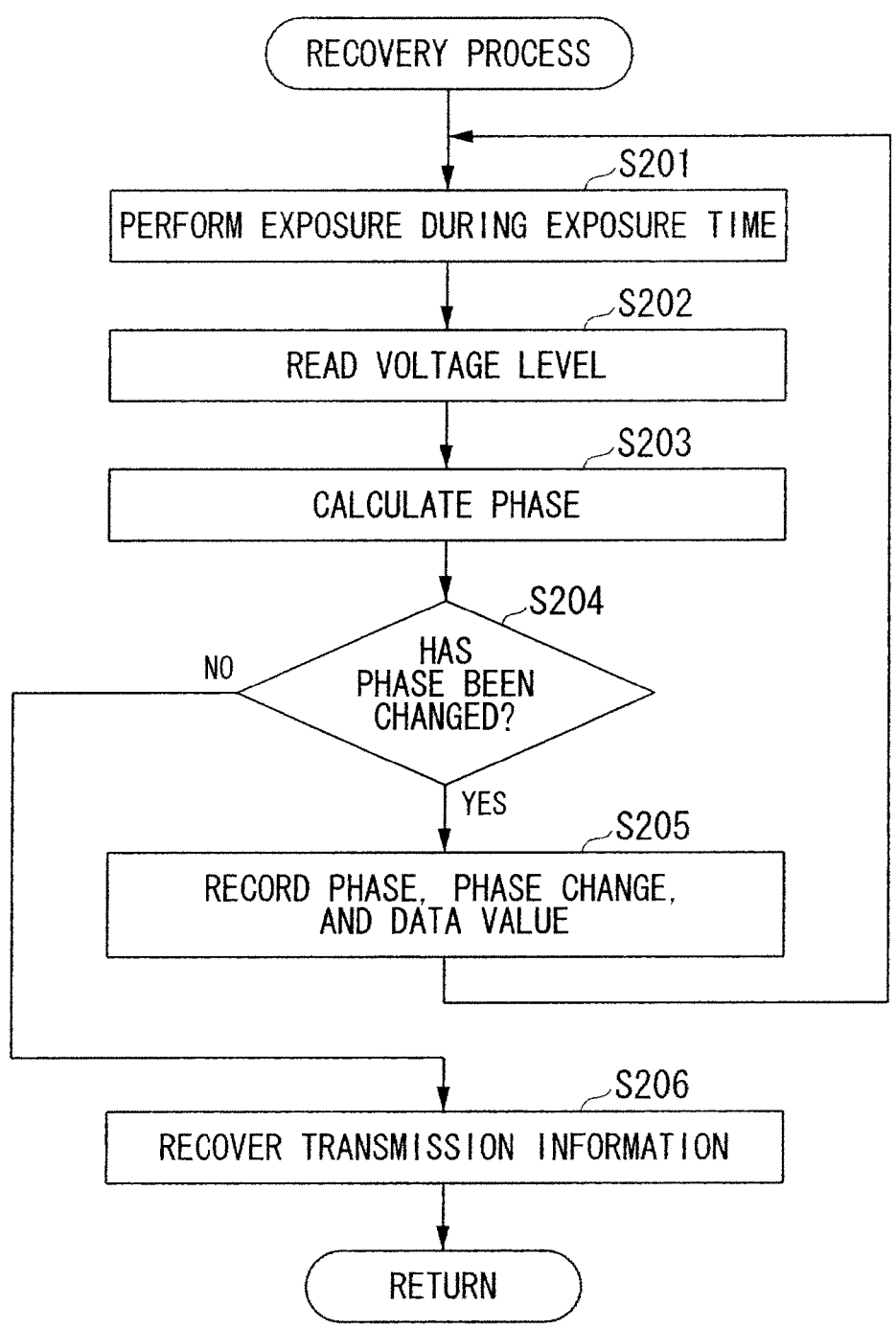
FIG. 14 is a flowchart showing the detailed process flow of a bit recovery process.

FIG. 14 is a flowchart showing the flow of a detailed process of a bit recovery process. First, the light receiving unit 32 performs an exposure operation during a predetermined exposure time (for example, 50 μsec) (step S201). When the predetermined exposure time has elapsed, the phase calculation unit 33 reads a voltage level value from a processing target pixel (step S202). Next, the phase calculation unit 33 calculates a phase on the basis of the read voltage level value (step S203). Next, the demodulator 34 determines whether the newly calculated phase is different from the phase of the previous frame (step S204). When the phase of a frame as a current processing object is different from the phase of the previous frame (step S204—YES), the demodulator 34 records the calculated phase, a phase difference, and a data value to the demodulation table (step S205), and the process after step S201 is repeatedly executed when a read time has elapsed.

On the other hand, when the phase of the frame as the current processing object is the same as the phase of the previous frame (step S204—NO), the demodulator 34 determines that a terminal frame has been received, generates a bit stream by arranging data values recorded to the demodulation table in a frame sequence, recovers transmission information (step S206), and terminates the bit stream recovery process.

In the optical communication system 1 constituted as described above, data communication using intensity-modulated light is possible. In the reception device 3, data communication using visible light is possible by employing the visible light as intensity-modulated light. Since the configuration as shown in FIGS. 8 and 9 is adopted in the pixel 321 of the reception device 3 in the optical communication system 1, it is possible to implement miniaturization and low power consumption of the reception device 3.

Modified Example

Figure 15:
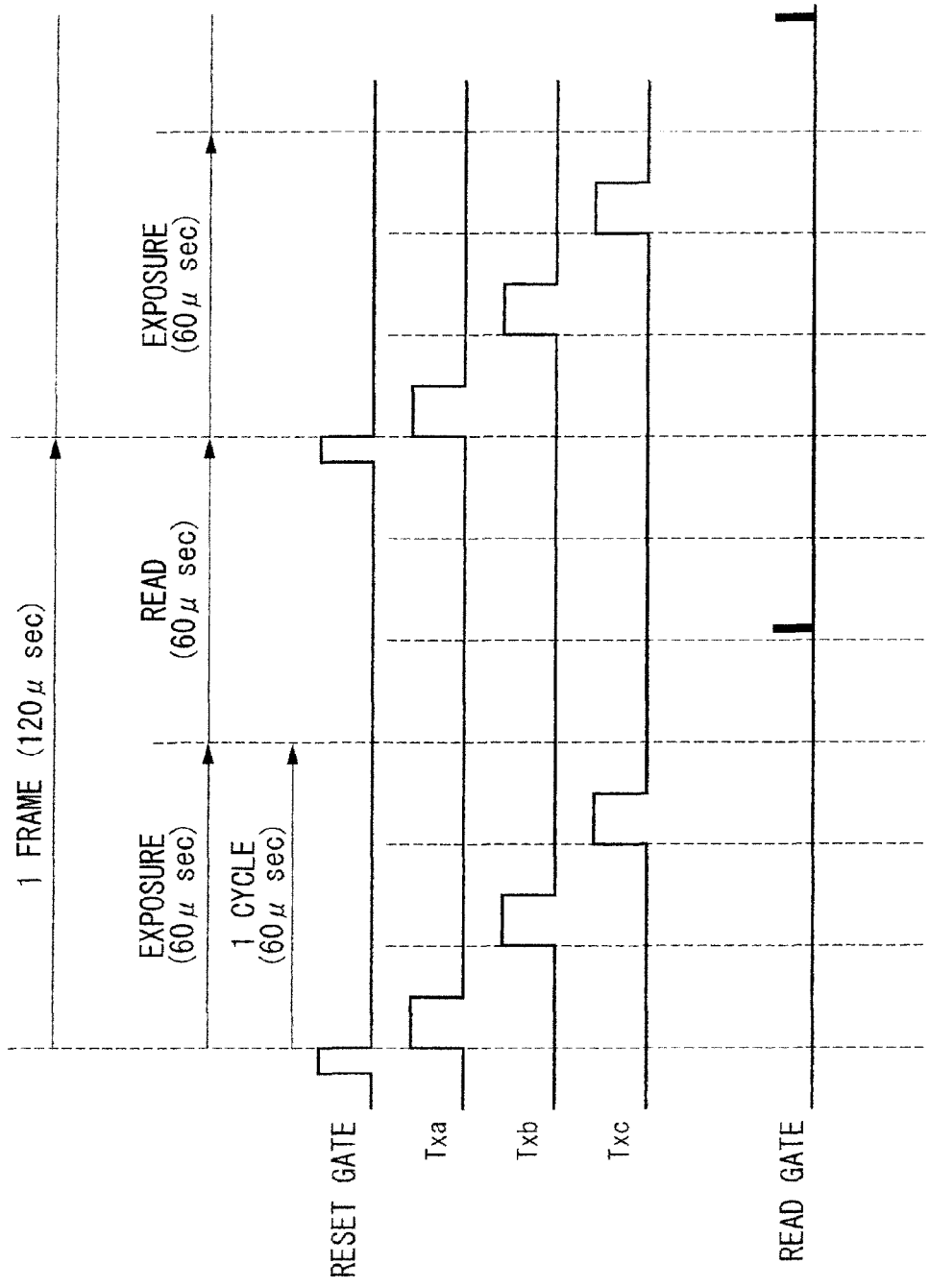
FIG. 15 is a timing chart showing the operation of a pixel constituted to accumulate charges by 3 charge accumulation regions.

The pixel 321 may be constituted to accumulate charges by three charge accumulation regions 3212a to 3212c and the phase calculation unit 33 may be constituted to calculate an amplitude R and a phase θ on the basis of three voltage levels. FIG. 15 is a timing chart showing the operation of the pixel 321 constituted to accumulate charges by the three charge accumulation regions 3212a to 3212c. In FIG. 15, one cycle represents one cycle of a sinusoidal wave constituting a carrier and is 60 μsec. In FIG. 15, an exposure time by the pixel 321 is a time of one cycle and thereafter a read time is also a time of one cycle.

First, immediately before the exposure process is started, the pixel 321 resets (charges) the charge transfer region 3213 and the charge accumulation regions 3212a to 3212c by opening the reset gates Ra to Rc and also opening the 3 distribution gates Txa to Txc. When the exposure time starts, the pixel 321 first opens the distribution gate Txa and accumulates charges generated by the 4 micro-conversion units 3211a to 3211d to the charge accumulation region 3212a (the capacitor Ca) via the charge transfer region 3213.

Next, the pixel 321 closes the distribution gate Txa before the ⅓ cycle has elapsed after the start of the exposure time, opens the distribution gate Txb at the timing of the passage of the ⅓ cycle, and accumulates charges generated by the 4 micro-conversion units 3211a to 3211d to the charge accumulation region 3212b (the capacitor Cb) via the charge transfer region 3213. Next, the pixel 321 closes the distribution gate Txb before the ⅔ cycle has elapsed after the start of the exposure time, opens the distribution gate Txc at the timing of the passage of the ⅔ cycle, and accumulates charges generated by the 4 micro-conversion units 3211a to 3211d to the charge accumulation region 3212c (the capacitor Cc) via the charge transfer region 3213. Before one cycle has elapsed after the start of the exposure time, the pixel 321 closes the distribution gate Txc and executes a reset process in preparation for a process for the next frame.

When the process of one cycle is completed, the pixel 321 opens the read gates Ta to Tc during the read time. Since voltages of the capacitors Ca to Cc are applied to the gates of the level shift transistors La to Lc, a current corresponding to the voltage level of each capacitor flows through the phase calculation unit 33 in response to an opening operation of the read gates Ta to Tc. The phase calculation unit 33 calculates the phase of a carrier on the basis of voltage levels read from the read gates Ta to Tc.

Figure 16:
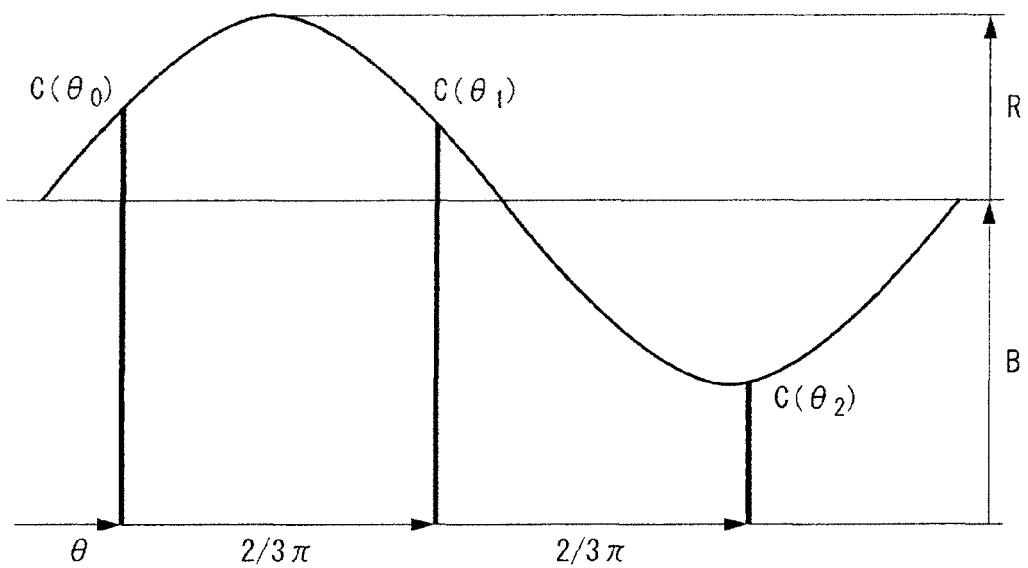
FIG. 16 is a schematic diagram showing an outline for calculating the amplitude and phase of a carrier on the basis of 3 voltage levels read from the pixel.

FIG. 16 is a schematic diagram showing an outline for calculating the amplitude and phase of a carrier on the basis of 3 voltage levels read from the pixel 321. The waveform shown in FIG. 16 represents a sinusoidal wave of one cycle constituting the carrier. $C(\theta_0)$, $C(\theta_1)$, and $C(\theta_2)$ are voltage levels respectively read from the charge accumulation regions 3212a to 3212c of the pixel 321, that is, intensities of the carrier for every ⅓ cycle. The phase calculation unit 33 calculates a carrier amplitude R by substituting $C(\theta_0)$, $C(\theta_1)$, and $C(\theta_2)$ into Expression (3).

$$B = \frac{C(\theta_0) + C(\theta_1) + C(\theta_2)}{3} \quad \text{[Expression 3]}$$

$$R = \frac{2\sqrt{2}}{3}\sqrt{(C(\theta_0) - C(\theta_1))^2 + (C(\theta_1) - C(\theta_2))^2 + (C(\theta_2) - C(\theta_0))^2}$$

The phase calculation unit 33 calculates a carrier phase θ by substituting $C(\theta_A)$, $C(\theta_1)$, and $C(\theta_2)$ and values of R and B calculated by Expression (3) to Expression (4), and outputs the calculated phase to the demodulator 34.

$$\frac{\sqrt{3}\{C(\theta_1) - C(\theta_2)\}}{2C(\theta_0) - C(\theta_1) - C(\theta_2)} = \frac{\sqrt{3}\left[\left\{R\cos\left(\theta + \frac{2}{3}\pi\right) + B\right\} - \left\{R\cos\left(\theta - \frac{2}{3}\pi\right) + B\right\}\right]}{2\{R\cos\theta + B\} - \left\{R\cos\left(\theta + \frac{2}{3}\pi\right) + B\right\} - \left\{R\cos\left(\theta - \frac{2}{3}\pi\right) + B\right\}} \quad \text{[Expression 4]}$$

$$= \frac{\sqrt{3}\left\{\cos\left(\theta + \frac{2}{3}\pi\right) - \cos\left(\theta - \frac{2}{3}\pi\right)\right\}}{2\cos\theta - \cos\left(\theta + \frac{2}{3}\pi\right) - \cos\left(\theta - \frac{2}{3}\pi\right)}$$

$$= \frac{\sqrt{3}\left\{\cos\theta\cos\frac{2}{3}\pi - \sin\theta\sin\frac{2}{3}\pi - \cos\theta\cos\left(-\frac{2}{3}\pi\right) + \sin\theta\sin\left(-\frac{2}{3}\pi\right)\right\}}{2\cos\theta - \cos\theta\cos\frac{2}{3}\pi + \sin\theta\sin\frac{2}{3}\pi - \cos\theta\cos\left(-\frac{2}{3}\pi\right) + \sin\theta\sin\left(-\frac{2}{3}\pi\right)}$$

$$= \frac{\sqrt{3}\left\{-\frac{1}{2}\cos\theta + \frac{\sqrt{3}}{2}\sin\theta + \frac{1}{2}\cos\theta + \frac{\sqrt{3}}{2}\sin\theta\right\}}{2\cos\theta + \frac{1}{2}\cos\theta - \frac{\sqrt{3}}{2}\sin\theta + \frac{1}{2}\cos\theta + \frac{\sqrt{3}}{2}\sin\theta}$$

$$= \frac{3\sin\theta}{2\cos\theta + \frac{1}{2}\cos\theta + \frac{1}{2}\cos\theta}$$

$$= \frac{\sin\theta}{\cos\theta}$$

$$= \tan\theta$$

$$\theta = \begin{cases} \tan^{-1}\dfrac{\sqrt{3}\,\{C(\theta_1) - C(\theta_2)\}}{2C(\theta_0) - C(\theta_1) - C(\theta_2)} & \text{When } (0 < 2C(\theta_0) - C(\theta_1) - C(\theta_2)) \\ -\dfrac{\pi}{2} + \tan^{-1}\dfrac{\sqrt{3}\,\{C(\theta_1) - C(\theta_2)\}}{2C(\theta_0) - C(\theta_1) - C(\theta_2)} & \text{When } (2C(\theta_0) - C(\theta_1) - C(\theta_2) < 0, \\ & C(\theta_1) - C(\theta_2) < 0 \\ \dfrac{\pi}{2} + \tan^{-1}\dfrac{\sqrt{3}\,\{C(\theta_1) - C(\theta_2)\}}{2C(\theta_0) - C(\theta_1) - C(\theta_2)} & \text{When } (2C(\theta_0) - C(\theta_1) - C(\theta_2) < 0, \\ & 0 < C(\theta_1) - C(\theta_2) \\ -\dfrac{\pi}{2} & \text{When } (2C(\theta_0) - C(\theta_1) - C(\theta_2) = 0, \\ & C(\theta_1) - C(\theta_2) < 0 \\ \dfrac{\pi}{2} & \text{When } (2C(\theta_0) - C(\theta_1) - C(\theta_2) = 0, \\ & 0 < C(\theta_1) - C(\theta_2) \end{cases}$$

Since it is possible to calculate the amplitude and phase of a carrier when three voltage levels are measured according to the reception device 3 constituted as described above, the number of elements of the charge accumulation regions 3212 or distribution gates of the pixel 321 can be reduced, and miniaturization and cost reduction of the pixel 321 can be implemented. Since the exposure time for the carrier of the same cycle is set to be longer as compared with when four voltage levels are measured, it is possible to improve the accuracy of calculating the amplitude and phase. For the same reason, it is possible to increase the frequency of the carrier (or shorten a cycle thereof) while maintaining the length of the exposure time as compared with when the four voltage levels are measured. In this case, it is possible to improve the transmission rate. It is possible to reduce power consumption by decreasing the number of charge read operations as compared with the related art. For example, in the case of FIG. 10, 4 read processes are necessary when reading accumulated charges from Txa to Txd in the related art, but the reception device 3 can read charges by one read process.

The read time is the time of one cycle in the above description (specifically, FIG. 10), but this time may be set as the time of a plurality of cycles. The time of one cycle of the carrier is not necessary to be limited to the above-described specific example, and may be set to any length time. The carrier may be constituted as a wave (for example, a saw-tooth wave, a triangle wave, a square wave, or the like) having a waveform different from a sinusoidal wave. When the carrier is constituted using the saw-tooth wave, the phase calculation unit 33 can calculate a phase by the above-described process. To set the calculated phase value to a more accurate value, the phase calculation unit 33 may be constituted to correct the phase value on the basis of a correction table. FIG. 17 is a diagram showing a specific example of the correction table. In this case, the correction table stores an accurate phase (corrected angle) for each phase (estimated angle) calculated from the saw-tooth wave, wherein each value is produced and preset by a calculation or the like. When the carrier is constituted using the square wave, the width is set to be formed during the period in which the distribution gates Txa to Txd are opened.

Specifically, a temporal width of $2\pi/3$ is set when 3 intensities are detected in one cycle of the carrier and a temporal width of $\pi/2$ is set when 4 intensities are detected in one cycle of the carrier. In the above-described configuration, the phase calculation unit 33 can handle a saw-tooth wave by integrating the square wave, and calculate the phase by the above-described process.

Second Embodiment

The second embodiment of the optical communication system 1 is different from the first embodiment in that the exposure time of a carrier is set to be a plurality of cycles. The rest of the configuration is the same as that of the first embodiment. In the second embodiment of the optical communication system 1, the difference with the first embodiment will be described.

Figure 18:
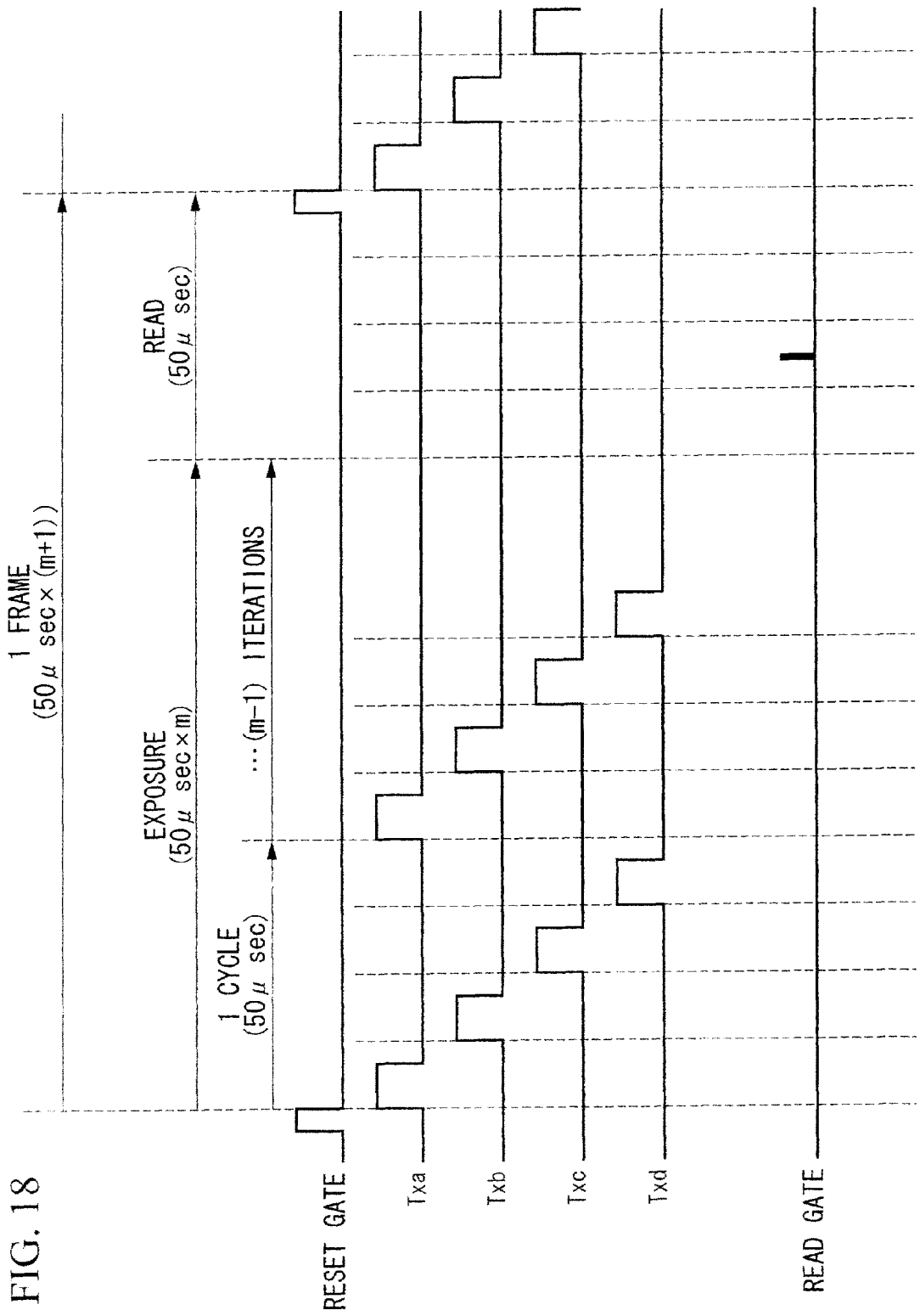
FIG. 18 is a timing chart showing the operation of a pixel according to a second embodiment.

FIG. 18 is a timing chart showing the operation of the pixel 321 according to the second embodiment.

In FIG. 18, the exposure time by the pixel 321 is the time of m cycles (where m is an integer equal to or more than 2), and thereafter the read time of one cycle exists. That is, in the second embodiment, the transmission device 2 generates and emits a carrier of one frame using a sinusoidal wave of (m+1) cycles. An "m" value is shared in advance between the transmission device 2 and the reception device 3.

Next, the operation of the pixel 321 in the second embodiment will be described using FIG. 18. First, immediately before the exposure process is started, the pixel 321 resets (charges) the charge transfer region 3213 and the charge accumulation regions 3212a to 3212d by opening the reset gates Ra to Rd and also opening the 4 distribution gates Txa to Txd. When the exposure time starts, the pixel 321 first opens the distribution gate Txa and accumulates charges generated by the 4 micro-conversion units 3211a to 3211d to the charge accumulation region 3212a (the capacitor Ca) via the charge transfer region 3213.

Next, the pixel 321 closes the distribution gate Txa before the ¼ cycle has elapsed after the start of the exposure time, opens the distribution gate Txb at the timing of the passage of the ¼ cycle, and accumulates charges generated by the 4 micro-conversion units 3211a to 3211d to the charge accumulation region 3212b (the capacitor Cb) via the charge transfer region 3213. Next, the pixel 321 closes the distribution gate Txb before the 2/4 cycle has elapsed after the start of the exposure time, opens the distribution gate Txc at the timing of the passage of the 2/4 cycle, and accumulates charges generated by the 4 micro-conversion units 3211a to 3211d to the charge accumulation region 3212c (the capacitor Cc) via the charge transfer region 3213. Next, the pixel 321 closes the distribution gate Txc before the ¾ cycle has elapsed after the start of the exposure time, opens the distribution gate Txd at the timing of the passage of the ¾ cycle, and accumulates charges generated by the 4 micro-conversion units 3211a to 3211d to the charge accumulation region 3212d (the capacitor Cd) via the charge transfer region 3213. The pixel 321 closes the distribution gate Txd before one cycle has elapsed after the start of the exposure time.

When the process of one cycle is completed, the pixel 321 starts the exposure process of the next cycle and repeats the exposure process of opening each of the distribution gates Txa to Txd for every ¼ cycle and repeatedly accumulating charges to the charge accumulation regions 3212a to 3212d m times. At this time, after the exposure time starts, the pixel 321 does not execute the reset process until the exposure processes of m cycles are completed. Thus, charges received by the process of each cycle are sequentially integrated in the capacitors Ca to Cd. When the exposure time of m cycles has expired, the read time starts and the read gates Ta to Td are opened. Since voltages of the capacitors Ca to Cd are applied to the gates of the level shift transistors La to Ld, a current corresponding to the voltage level of each capacitor flows through the phase calculation unit 33 in response to the opening operation of the read gates Ta to Td. The phase calculation unit 33 calculates the amplitude and phase of a carrier on the basis of the voltage level read from each of the read gates Ta to Td.

The second embodiment is different from the first embodiment in that the exposure time in step S201 of FIG. 14 becomes a length of m cycles in a bit stream recovery process according to the second embodiment. The flow of the other processes is the same as that of the first embodiment.

In the optical communication system 1 of the second embodiment constituted as described above, the phase calculation unit 33 calculates the phase of a carrier on the basis of charges accumulated by the exposure process in the exposure time of a plurality of cycles (m cycles). Thus, the influence of noise or the like by environment light is reduced and the phase is calculated with higher reliability as compared with when the carrier phase is calculated on the basis of charges accumulated by the exposure process in the exposure time of one cycle.

In the related art, it is necessary to read charges accumulated for every exposure time at each charge accumulation timing of m cycles and integrate read results when the phase is calculated using a sinusoidal wave of a plurality of cycles (m cycles) as the object to be measured. For example, since a charge read result is acquired for every ¼ cycle when the amplitude and phase of the carrier of m cycles are calculated using Expressions 1 and 2, it is necessary to execute m exposure processes and m read processes at the timings of respective ¼ cycles and integrate the read results. However, switching noise (read noise) occurs at the time of reading charges. Thus, when read results of the m cycles (m read results) are integrated, read noise generated m times is integrated and the influence of read noise is increased in response to the "m" value.

On the other hand, the pixel 321 only accumulates charges at the respective charge accumulation timings of the m cycles, and reads the charges accumulated in the m cycles once in the optical communication system 1 of the second embodiment. Thus, read noise is generated only once in the charge integration result of m cycles. It is possible to reduce the influence of read noise as compared with the related art. In addition, it is possible to improve the sensitivity of the pixel 321 in the optical communication system 1 of the second embodiment.

Modified Example

The second embodiment may be modified and constituted like the modified example of the first embodiment.

Third Embodiment

The third embodiment of the optical communication system 1 is different from the second embodiment in that a plurality of exposure times and a plurality of read times are set during one frame time of a carrier. The rest of the configuration is the same as that of the second embodiment. Hereinafter, the difference of the third embodiment of the optical communication system 1 with the second embodiment will be described.

Figure 19:
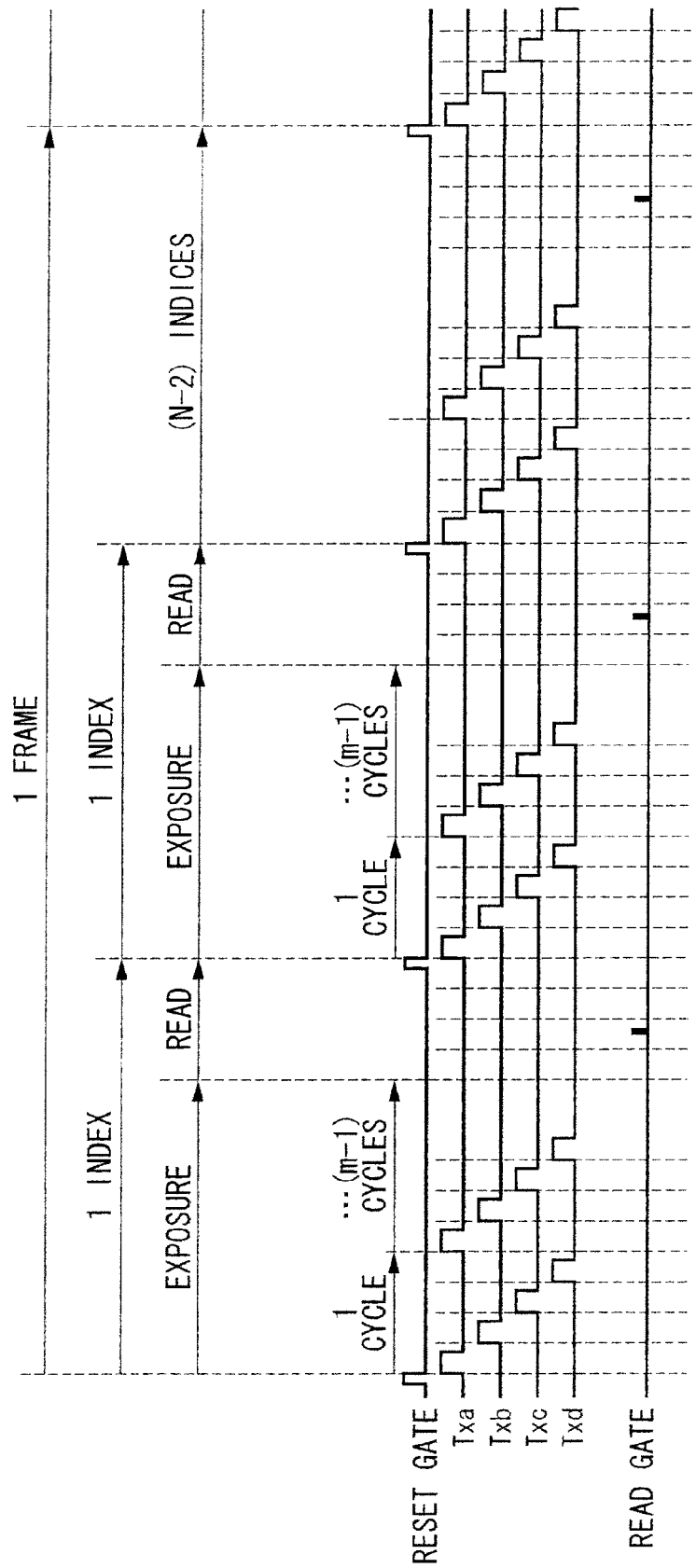
FIG. 19 is a timing chart showing the operation of a pixel according to a third embodiment.

FIG. 19 is a timing chart showing the operation of the pixel 321 according to the third embodiment.

In FIG. 19, an exposure time by the pixel 321 is the time of m cycles (m is an integer equal to or more than 2), and thereafter a read time of one cycle exists. Hereinafter, one set of an exposure time and a read time is represented by a unit of 1 index. In the third embodiment, "n" indices are set in one frame. That is, the transmission device 2 of the third embodiment generates a carrier of one frame using a sinusoidal wave of {(m+1)×n} cycles. The reception device 3 of the third embodiment executes "n"-index (n) exposure processes and "n"-index (n) read processes for a carrier of one frame.

Next, the operation of the pixel 321 in the third embodiment will be described using FIG. 19. First, immediately before the exposure process is started, the pixel 321 resets (charges) the charge transfer region 3213 and the charge accumulation regions 3212a to 3212d by opening the reset gates Ra to Rd and also opening the 4 distribution gates Txa to Txd. When the exposure time starts, the pixel 321 first opens the distribution gate Txa and accumulates charges generated by the 4 micro-conversion units 3211a to 3211d to the charge accumulation region 3212a (the capacitor Ca) via the charge transfer region 3213.

Next, the pixel 321 closes the distribution gate Txa before the ¼ cycle has elapsed after the start of the exposure time, opens the distribution gate Txb at the timing of the passage of the ¼ cycle, and accumulates charges generated by the 4 micro-conversion units 3211a to 3211d to the charge accumulation region 3212b (the capacitor Cb) via the charge transfer region 3213. Next, the pixel 321 closes the distribution gate Txb before the 2/4 cycle has elapsed after the start of the exposure time, opens the distribution gate Txc at the timing of the passage of the 2/4 cycle, and accumulates charges generated by the 4 micro-conversion units 3211a to 3211d to the charge accumulation region 3212c (the capacitor Cc) via the charge transfer region 3213. Next, the pixel 321 closes the distribution gate Txc before the ¾ cycle has elapsed after the start of the exposure time, opens the distribution gate Txd at the timing of the passage of the ¾ cycle, and accumulates charges generated by the 4 micro-conversion units 3211a to 3211d to the charge accumulation region 3212d (the capacitor Cd) via the charge transfer region 3213. The pixel 321 closes the distribution gate Txd before one cycle has elapsed after the start of the exposure time.

When the process of one cycle is completed, the pixel 321 starts the exposure process of the next cycle and repeats the exposure process of opening each of the distribution gates Txa to Txd for every ¼ cycle and repeatedly accumulating charges to the charge accumulation regions 3212a to 3212d m times. At this time, after the exposure time starts, the pixel 321 does not execute the reset process until the exposure operations of m cycles are completed. Thus, charges received by the process of each cycle are sequentially integrated in the capacitors Ca to Cd. When the exposure time of m cycles has expired, the read time starts and the read gates Ta to Td are opened. Since voltages of the capacitors Ca to Cd are applied to the gates of the level shift transistors La to Ld, a current corresponding to the voltage level of each capacitor flows through the phase calculation unit 33. The phase calculation unit 33 calculates the amplitude and phase of a carrier on the basis of the voltage level read from each of the read gates Ta to Td. The pixel 321 and the phase calculation unit 33 calculate n phases for each frame by repeatedly executing the above process for each frame n times.

FIG. 20 is a diagram showing a specific example of a demodulation table generated by the demodulator 34 of the third embodiment. In the case of FIG. 20, the number of indices, n, included in one frame is "3".

The demodulation table according to the third embodiment has an accumulated value of indices, a phase calculated for each index, a representative phase of each frame, a phase difference in each frame, and a data value corresponding to a phase difference which is associated for every frame number.

The demodulator 34 determines the representative phase of each frame among n phases calculated for each frame by a majority decision. That is, the demodulator 34 determines a most frequently calculated value as the representative phase by comparing phase values calculated by indices within the same frame.

For example, phases calculated in the first frame of FIG. 20 are "0", "1", and "1" and the representative phase becomes "1" since "1" is the most frequently calculated value.

Phase difference represents the phase difference between the representative phase of each frame and the representative phase of a previously transmitted frame. The data value is a bit steam corresponding to the phase difference, and is a bit stream obtained on the basis of the π/4-DQPSK scheme in the case of FIG. 20. The demodulator 34 generates a transmitted bit stream by creating the demodulation table and finally sequentially arranging the data value corresponding to each frame. The decoder 35 recovers transmission information by executing a decoding process for the generated bit stream.

Figure 21:
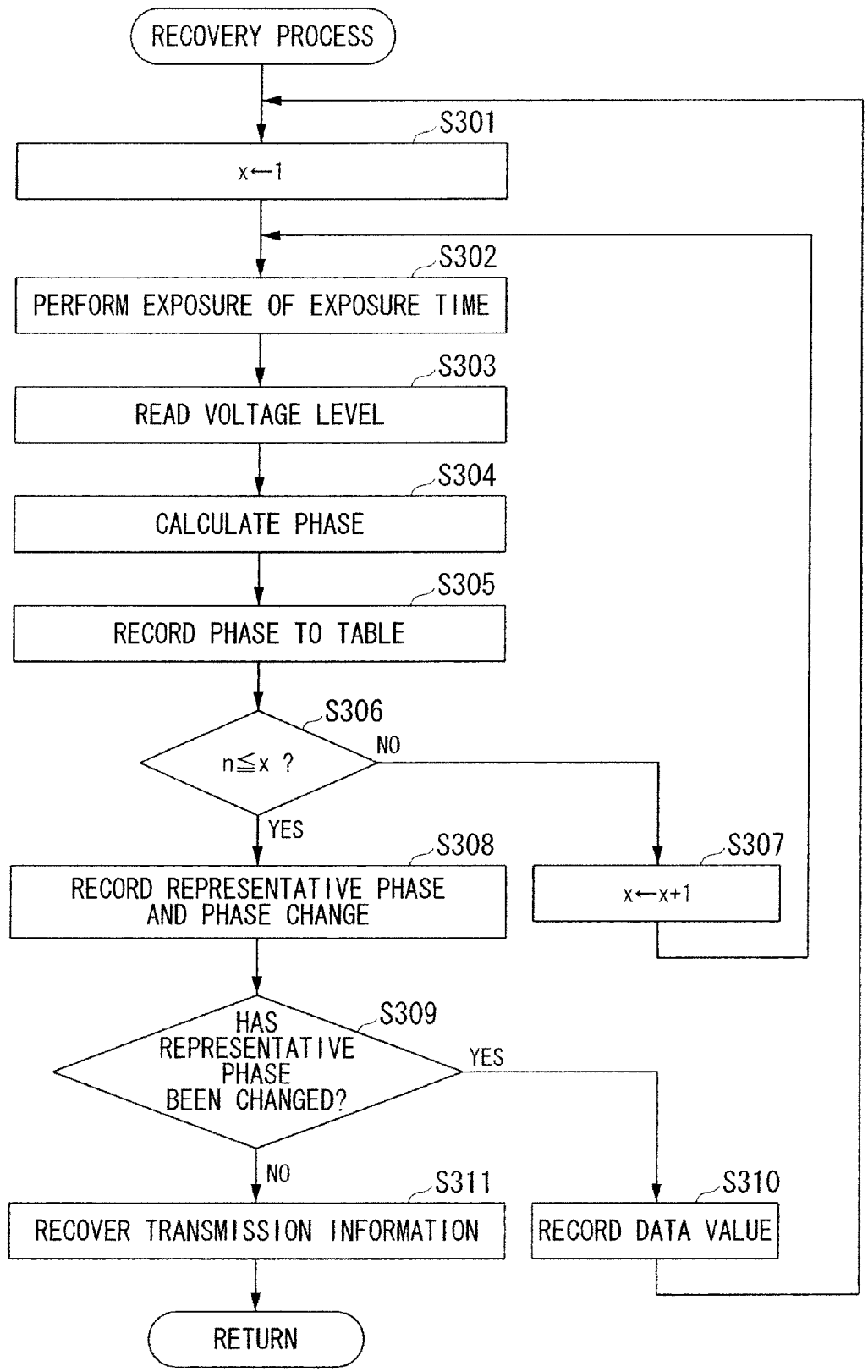
FIG. 21 is a flowchart showing the detailed process flow of a bit recovery process according to the third embodiment.

FIG. 21 is a flowchart showing the flow of a detailed process of the bit recovery process according to the third embodiment. First, the demodulator 34 initializes a counter x by substituting 1 into the counter x (step S301). Next, the light receiving unit 32 performs an exposure operation during a predetermined exposure time (step S302). When the predetermined exposure time has elapsed, the phase calculation unit 33 reads the voltage level value from the processing object pixel (step S303). Next, the phase calculation unit 33 calculates the phase on the basis of the voltage level value (step S304). The demodulator 34 records the calculated phase to the corresponding index field (step S305).

Next, the demodulator 34 determines whether or not the value of the counter x is equal to or more than the number of indices (n) included in one frame (step S306). When the value of the counter x is less than n (step S306—NO), it returns to the process of step S302 and the process to step S307 is repeatedly executed.

On the other hand, when the value of the counter x is equal to or more than n (step S306—YES), the demodulator 34 determines the representative phase and records the representative phase and the phase difference to the demodulation table (step S308). The demodulator 34 determines whether or not the representative phase of the frame as the current processing object is different from the representative phase of the previous frame (step S309). When the representative phase of the frame as the current processing object is different from the representative phase of the previous frame (step S309—YES), the demodulator 34 records the data value corresponding to the phase difference to the demodulation table (step S310). When the read time has elapsed, the process after step S301 is repeatedly executed.

On the other hand, when the representative phase of the frame as the current processing object is the same as the representative phase of the previous frame (step S309—NO), the demodulator 34 determines that a terminal frame has been received, generates a bit stream by arranging data values recorded to the demodulation table in a frame sequence, recovers transmission information (step S311), and terminates a bit stream recovery process.

In the optical communication system 1 of the third embodiment constituted as described above, the reception device 3 calculates phases at a plurality of timings by a plurality of exposure processes and a plurality of read processes when calculating a phase (representative phase) of one frame, and determines a representative phase by a majority decision on the basis of the results thereof. Thus, it is possible to improve the accuracy of calculating a representative phase of each frame.

Figure 22A:
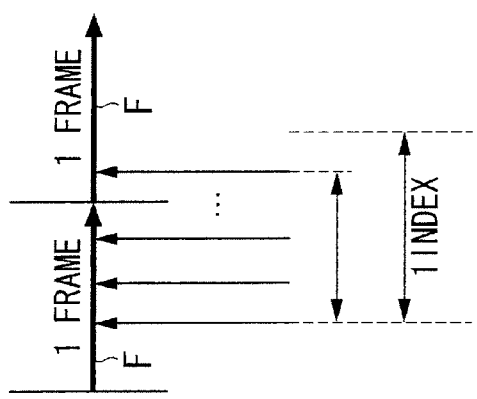
FIGS. 22A and 22B are diagrams illustrating effects by an optical communication system according to the third embodiment.
Figure 22B:
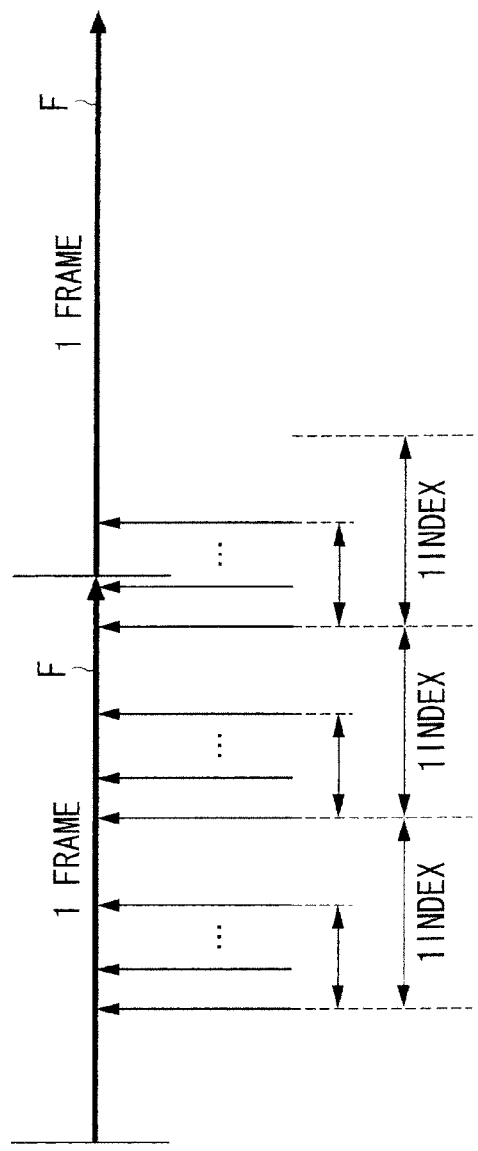

FIGS. 22A and 22B are diagrams illustrating effects by the optical communication system 1 of the third embodiment. In FIGS. 22A and 22B, a thick arrow indicated by the letter "F" indicates the frame time of one frame, and a rising arrow indicates each charge accumulation timing of every ¼ cycle by the light receiving unit 32. FIG. 22A shows an example in which the number of indices included in one frame is 1 and a phase value calculated once becomes the representative phase value. When the number of phase calculations is constituted to be 1 as in FIG. 22A, there is a possibility that the light of a carrier of the next frame may be received before the exposure time has expired in the case where the start timing of the frame time is different from the start timing of the exposure time. In this case, charges obtained by receiving the light of the carrier of the next frame are also accumulated to the accumulation regions 3212a to 3212d, and a phase is calculated on the basis of a voltage level affected by the carrier of the next frame. Thus, there is a problem in that the phase calculation accuracy may be degraded.

FIG. 22B is a diagram showing the operation of the reception device 3 of the third embodiment, and shows an example in which the number of indices included in one frame is 3, 3 phases are calculated, and a representative phase is determined by a majority decision. When a plurality of phase calculations (at least 3 phase calculations) is constituted as in FIG. 22B, it is possible to calculate a phase on the basis of a voltage level which is not affected by the carrier of the next frame in at least several calculations (2 calculations in the case of FIG. 22B) even when the start timing of the frame time is different from the start timing of the exposure time. When the number of indices is equal to or more than 3 as shown in FIG. 22B, the number of phase calculations which are not affected by the carrier of the next frame is larger than the number of phase calculations affected by the carrier of the next frame. Thus, a phase calculated on the basis of a voltage level which is not affected by the carrier of the next frame is determined as a representative phase by determining the representative phase by a majority decision as in the reception device 3 of the third embodiment. Therefore, in the third embodiment, it is possible to execute an accurate demodulation process by improving the accuracy of calculating a representative phase of each frame as described above.

Modified Example

The third embodiment may be modified and constituted like the modified example of the first embodiment.

Fourth Embodiment

The fourth embodiment of the optical communication system 1 is different from the second embodiment in that the pixel 321 has a drain region. The rest of the configuration is the same as that of the second embodiment. Hereinafter, the difference of the fourth embodiment of the optical communication system 1 with the second embodiment will be described.

Figure 23:
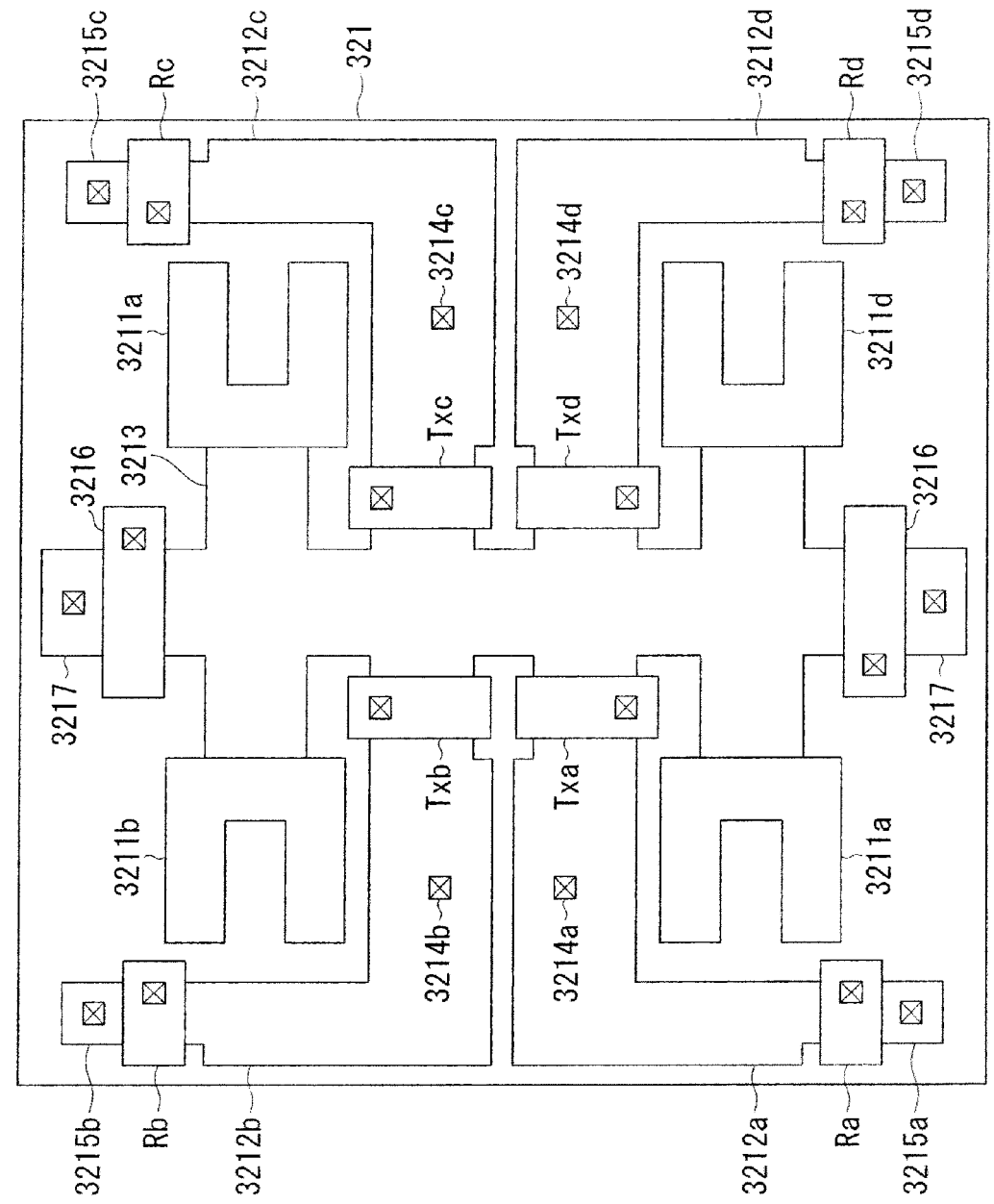
FIG. 23 is a configuration diagram showing the configuration of a pixel to be used in a light receiving unit according to a fourth embodiment.

FIG. 23 is a diagram showing the configuration of the pixel 321 used in the light receiving unit 32 according to the fourth embodiment. In the fourth embodiment, the pixel 321 further includes a drain gate 3216 and a drain region 3217 in addition to the configuration of the pixel 321 (FIG. 8) according to the first to third embodiments.

Figure 24:
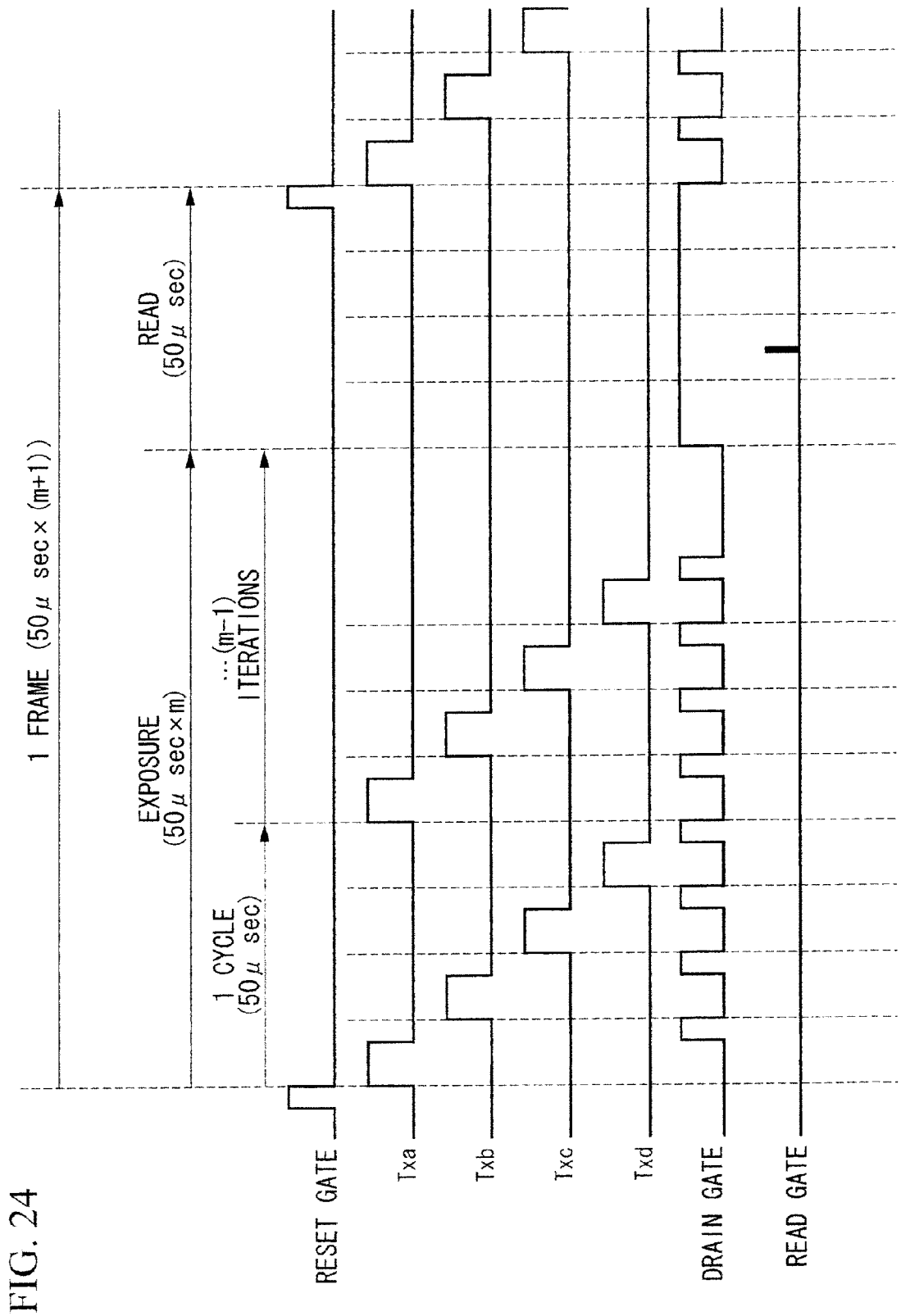
FIG. 24 is a timing chart showing the operation of the pixel according to the fourth embodiment.

FIG. 24 is a timing chart showing the operation of the pixel 321 according to the fourth embodiment.

In FIG. 24, an exposure time by the pixel 321 is the time of m cycles (where m is an integer equal to or more than 2), and thereafter a read time of one cycle exists.

In the pixel 321 according to the fourth embodiment, the drain gate 3216 is opened until the next distribution gate of the distribution gates Txa to Txd is opened after each of the distribution gates Txa to Txd is closed. When the drain gate 3216 is opened, charges generated by the 4 micro-conversion units 3211a to 3211d are moved to the drain region 3217 via the charge transfer region 3213 and the drain gate 3216. The charges moved to the drain region 3217 are discarded.

According to the light receiving unit 32 of the fourth embodiment constituted as described above, the drain region 3217 discards the charges generated until the next distribution gate of the distribution gates Txa to Txd is opened after a certain distribution gate of the distribution gates Txa to Txd is closed. Thus, it is possible to exactly set the amount of charges to be accumulated at each charge accumulation timing and improve the accuracy of phase calculation by preventing the generated charges from being moved to the charge accumulation regions 3212a to 3212d after the previous distribution gates Txa to Txd are closed when the distribution gates Txa to Txd are opened.

Modified Example

The fourth embodiment may be modified and constituted like the modified example of the first embodiment. The drain gate 3216 and the drain region 3217 of the fourth embodiment may be installed in the pixel 321 of the first or third embodiment.

Fifth Embodiment

The light receiving unit 32 of the fifth embodiment of the optical communication system 1 is different from the light receiving unit 32 of the third embodiment in that the light receiving unit 32 includes a plurality of vertical scan circuits 322 (322a and 322b), a plurality of horizontal scan circuits 323 (323a and 323b), and a plurality of read circuits 324 (324a and 324b). The rest of the configuration is the same as that of the third embodiment. Hereinafter, the difference of the fifth embodiment of the optical communication system 1 from the third embodiment will be described.

Figure 25:
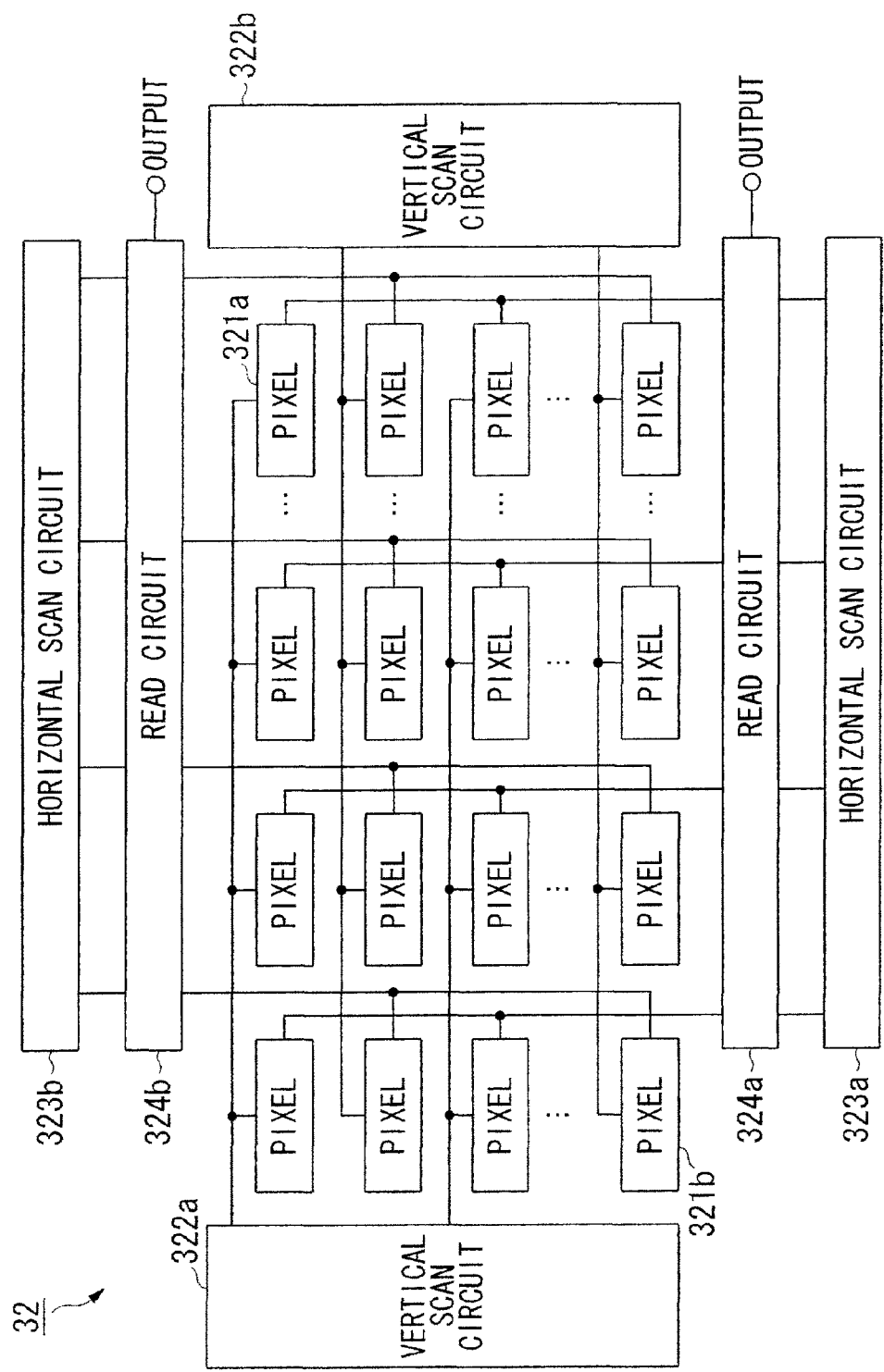
FIG. 25 is a schematic diagram showing an outline of the configuration of a light receiving unit according to a fifth embodiment.

FIG. 25 is a schematic diagram showing an outline of the configuration of the light receiving unit 32 according to the fifth embodiment. In the fifth embodiment, the light receiving unit 32 includes a plurality of pixels 321a connected to the vertical scan circuit 322a, the horizontal scan circuit 323a, and the read circuit 324a and a plurality of pixels 321b connected to the vertical scan circuit 322b, the horizontal scan circuit 323b, and the read circuit 324b.

Figure 26:
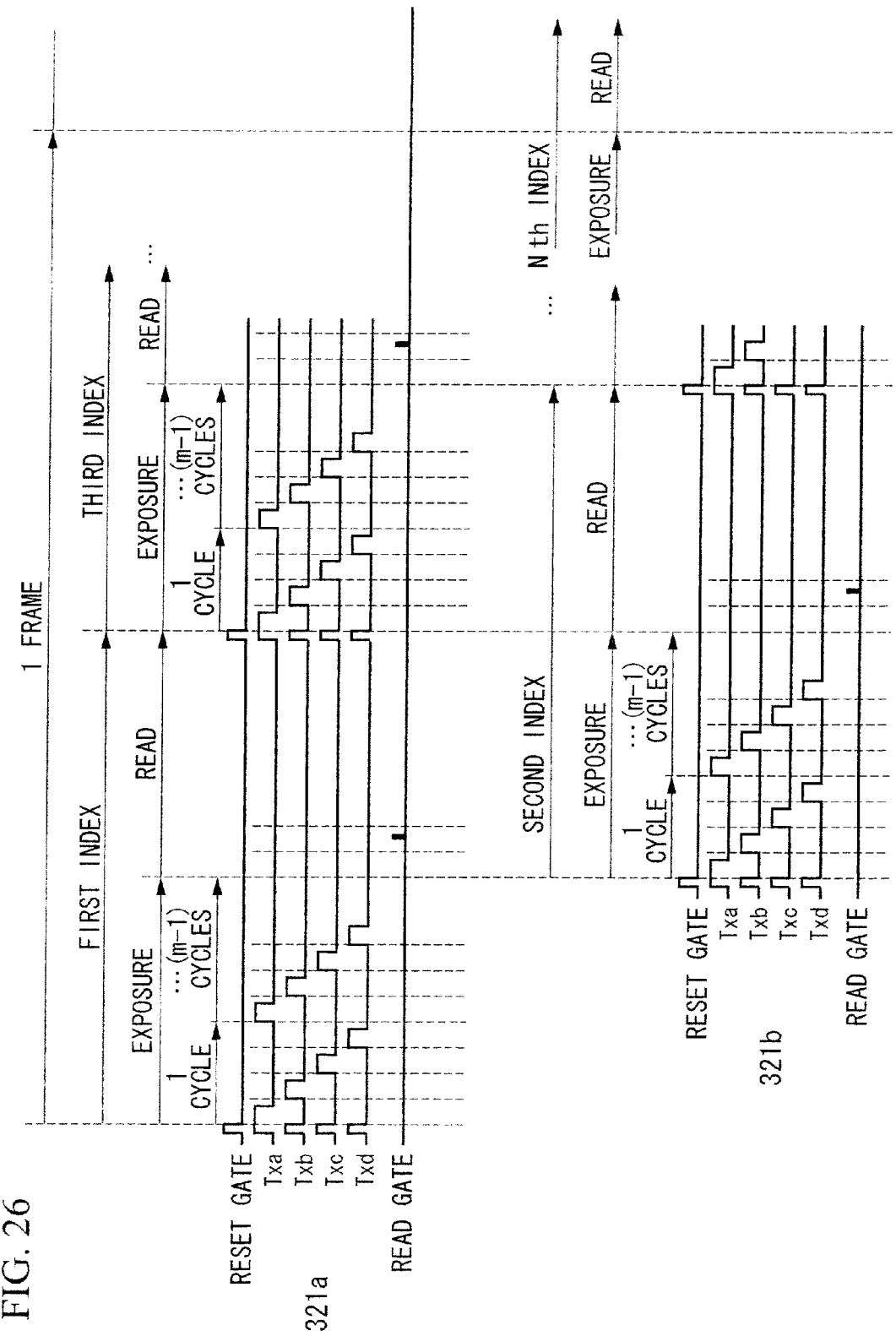
FIG. 26 is a timing chart showing the operation of the pixel according to the fifth embodiment.

FIG. 26 is a timing chart showing the operation of the pixel 321a and the pixel 321b according to the fifth embodiment. The pixel 321a and the pixel 321b alternately execute an exposure process and a read process. While the pixel 321a executes the exposure process, the pixel 321b executes the read process. While the pixel 321a executes the read process, the pixel 321b executes the exposure process.

It is not necessary to provide the read time in the frame time of the carrier since the pixel 321b executes the exposure process while the pixel 321a executes the read process in the fifth embodiment constituted as described above. That is, it is possible to set the frame time to be the same as the sum of exposure times and it is possible to shorten the frame time.

Modified Example

The fifth embodiment may be modified and constituted like the modified example of the first embodiment.

While the exemplary embodiments of the invention have been described with reference to the accompanying drawings, the detailed constitutions of the invention are not limited to the foregoing embodiments but embrace changes in design to the extent that they do not depart from the concept of the invention.

When m is equal to or more than 1, the present invention can reduce the number of charge read processes and can reduce power consumption. When m is equal to or more than 2, it is possible to reduce the influence of noise by environment light and it is possible to calculate a phase with higher reliability by employing charges accumulated m times as compared with the case where charges accumulated once are used. It is possible to reduce the influence of read noise since charges accumulated m times are read together at one time without executing the read process every time when chares are accumulated as in the past.

According to an aspect in which the demodulator executes a demodulation process on the basis of n phases, it is possible to improve the accuracy of demodulation since the demodulation process can be executed on the basis of another phase correctly calculated even when an accurate phase calculation fails.

According to an aspect in which a plurality of pixels is provided, it is possible to improve the processing rate since another pixel executes a light receiving process and a charge accumulation process while the phase calculation unit and the demodulation unit execute a process on the basis of one pixel.

According to an aspect in which a drain unit is provided, it is possible to improve the accuracy of phase calculation by exactly setting the amount of charges to be accumulated by each charge accumulation unit.

What is claimed is:
1. A reception device comprising:
a light receiving unit which receives intensity-modulated light from a transmission device, wherein the transmission device executes phase modulation to a bit stream as an object to be transmitted and emits the intensity-modulated light which has an intensity changing at a preset time cycle and a phase changing in response to the phase modulation, and the phase is maintained during M cycles (where M is an integer at least 2);
a phase calculation unit which detects the intensity of the intensity-modulated light p times per cycle of the intensity-modulated light (where p is an integer at least 3) and repeatedly calculates the phase of the intensity-modulated light on the basis of a result of the detection; and
a demodulation unit which executes demodulation, which corresponds to the phase modulation, to the phase calculated by the phase calculation unit, and generates transmitted bit stream, wherein the light receiving unit comprises:
- a photoelectric conversion unit which generates charges corresponding to an intensity of the intensity-modulated light as received;
- p charge accumulation units, which each accumulates charges generated by the photoelectric conversion unit m times (m is an integer at least 1 and at most M) in the same cycle as that of the intensity-modulated light; and
- a reset unit which resets the charges accumulated by the charge accumulation units after reading the accumulated charges, wherein each charge accumulation unit accumulates the charges at mutually different predetermined timings in one cycle of the intensity-modulated light, wherein the phase calculation unit detects the intensity of the intensity-modulated light on the basis of the accumulated charges by reading the charges accumulated m times in each of the p charge accumulation units, wherein the reset unit of the light receiving unit resets the charges after the charge accumulation units accumulate the charges m times, and the phase calculation unit reads the charges accumulated m times, and wherein p distribution gates are configured to permit the p charge accumulation units to accumulate charge at different times from one another during each cycle.

2. The reception device according to claim 1,
wherein a value of M is the product of n by m (n is an integer at least 2) and
the demodulation unit executes the demodulation on the basis of n phases calculated by the phase calculation unit.

3. The reception device according to claim 1, wherein
the light receiving unit comprises a plurality of pixels which each comprises the photoelectric conversion unit, the p charge accumulation units, and the reset unit,
one of pixels accumulates the charges when the phase calculation unit reads the charges from another pixel, and the other pixel accumulates the charges when the phase calculation unit reads the charges from the one of pixels.

4. The reception device according to claim 1, wherein the light receiving unit further comprises a drain unit which discards charges, which have been generated after one charge accumulation unit finishes accumulating charges and before another charge accumulation unit starts to accumulate charges.

5. The reception device according to claim 1, wherein the value of m is at least 2.

6. A reception method to be performed by a reception device comprising a photoelectric conversion unit which receives intensity-modulated light from a transmission device and generates charges corresponding to a light intensity, wherein the transmission device executes phase modulation to a bit stream as an object to be transmitted and emits the intensity-modulated light which has an intensity changing at a preset time cycle and a phase changing in response to the phase modulation, and the phase is maintained during M cycles (where M is an integer at least 2), p charge accumulation units, each accumulating charges generated by the photoelectric conversion unit m times (m is an integer at least 1 and at most M) in the same cycle as that of the intensity-modulated light, p distribution gates configured to permit the p charge accumulation units to accumulate charge at different times from one another during each cycle, and a reset unit which resets the charges accumulated by the charge accumulation units after reading the accumulated charges, the method comprising:
- receiving, by each charge accumulation unit, the intensity-modulated light and accumulating the charges at mutually different predetermined timings in one cycle of the intensity-modulated light;
- detecting, by the reception device, the intensity of the intensity-modulated light on the basis of the accumulated charges by reading the charges accumulated m times in each of the p charge accumulation units;
- resetting, by the reset unit of the reception device, the charges after the charge accumulation units accumulate the charges m times, and a phase calculation unit reads the charges accumulated m times;
- repeatedly calculating, by the reception device, the phase of the intensity-modulated light on the basis of a result of the detection; and
- executing, by the reception device, demodulation, which corresponds to the phase modulation, to the calculated phase, and generating transmitted bit stream.

* * * * *